US009290589B2

(12) United States Patent
Evans et al.

(10) Patent No.: US 9,290,589 B2
(45) Date of Patent: Mar. 22, 2016

(54) CYCLOPENTADIENYL-SUBSTITUTED SALAN CATALYSTS

(71) Applicants: ExxonMobil Chemical Patents Inc., Baytown, TX (US); Ramot at Tel-Aviv University Ltd., Tel Aviv (IL)

(72) Inventors: Meagan E. Evans, Houston, TX (US); David A. Cano, Houston, TX (US); Moshe Kol, Ramat Gan (IL); Konstantin Press, Rishon LeZion (IL)

(73) Assignees: ExxonMobil Chemical Patents Inc., Baytown, TX (US); Ramot at Tel-Aviv University Ltd., Tel Aviv, IL (US)

( * ) Notice: Subject to any disclaimer, the term of this patent is extended or adjusted under 35 U.S.C. 154(b) by 0 days.

(21) Appl. No.: 14/557,813

(22) Filed: Dec. 2, 2014

(65) Prior Publication Data

US 2015/0166690 A1   Jun. 18, 2015

Related U.S. Application Data

(60) Provisional application No. 61/982,823, filed on Apr. 22, 2014, provisional application No. 61/915,924, filed on Dec. 13, 2013.

(51) Int. Cl.

| C08F 4/76 | (2006.01) |
|---|---|
| C08F 110/06 | (2006.01) |
| C08F 110/02 | (2006.01) |
| C08F 10/00 | (2006.01) |
| C08F 4/659 | (2006.01) |

(52) U.S. Cl.
CPC ............... *C08F 110/06* (2013.01); *C08F 10/00* (2013.01); *C08F 110/02* (2013.01); *C08F 4/659* (2013.01); *C08F 4/65908* (2013.01); *C08F 4/65912* (2013.01)

(58) Field of Classification Search
CPC ........ C08F 4/76; C08F 4/60189; C08F 10/02; C08F 10/06
See application file for complete search history.

(56) References Cited

U.S. PATENT DOCUMENTS

| 4,066,715 | A | | 1/1978 | Isa et al. |
|---|---|---|---|---|
| 4,963,299 | A | * | 10/1990 | Scholtens et al. ............ 264/479 |
| 5,153,157 | A | | 10/1992 | Hlatky et al. |
| 5,942,459 | A | | 8/1999 | Sugano et al. |
| 5,955,557 | A | | 9/1999 | Machida et al. |
| 5,998,645 | A | | 12/1999 | Nestler |
| 6,309,997 | B1 | | 10/2001 | Fujita et al. |
| 6,399,724 | B1 | | 6/2002 | Matsui et al. |
| 6,444,773 | B1 | | 9/2002 | Markel |
| 6,459,005 | B1 | | 10/2002 | Hirano et al. |
| 6,462,136 | B1 | | 10/2002 | Saito et al. |
| 6,531,555 | B2 | | 3/2003 | Whiteker |
| 6,548,723 | B2 | | 4/2003 | Bagheri et al. |
| 6,632,899 | B2 | | 10/2003 | Kol et al. |
| 6,686,490 | B1 | | 2/2004 | Kol et al. |
| 6,699,824 | B1 | | 3/2004 | Dawson et al. |
| 7,105,703 | B1 | | 9/2006 | Atwood |
| 7,144,839 | B2 | | 12/2006 | Gibson et al. |
| 7,241,714 | B2 | | 7/2007 | Boussie et al. |
| 7,300,903 | B2 | | 11/2007 | Fujita et al. |
| 7,385,015 | B2 | | 6/2008 | Holtcamp |
| 7,514,510 | B2 | * | 4/2009 | Marin et al. ............ 526/170 |
| 7,531,602 | B2 | | 5/2009 | Hoang et al. |
| 7,544,749 | B2 | | 6/2009 | Jones et al. |
| 7,696,123 | B2 | | 4/2010 | Schneider et al. |
| 7,812,184 | B2 | | 10/2010 | Kondo et al. |
| 7,880,047 | B2 | | 2/2011 | Knowles et al. |
| 7,989,565 | B2 | | 8/2011 | Gibson et al. |
| 7,989,670 | B2 | | 8/2011 | Wu et al. |
| 8,058,373 | B2 | | 11/2011 | Stevens et al. |
| 8,101,696 | B2 | | 1/2012 | Konze et al. |
| 8,202,953 | B2 | | 6/2012 | Konze et al. |
| 8,222,358 | B2 | | 7/2012 | Rodriguez et al. |
| 8,227,392 | B2 | | 7/2012 | Wu et al. |
| 8,299,189 | B2 | | 10/2012 | Boone et al. |
| 8,450,438 | B2 | | 5/2013 | Aboelella et al. |
| 2002/0173604 | A1 | | 11/2002 | Kol et al. |
| 2003/0027955 | A1 | | 2/2003 | Ishii et al. |
| 2003/0105250 | A1 | | 6/2003 | Whiteker |
| 2004/0167016 | A1 | | 8/2004 | Holtcamp et al. |
| 2005/0075242 | A1 | | 4/2005 | Holtcamp et al. |
| 2005/0227860 | A1 | | 10/2005 | Green et al. |
| 2006/0100092 | A1 | | 5/2006 | Jones et al. |
| 2007/0021561 | A1 | | 1/2007 | Tse et al. |
| 2007/0208148 | A1 | | 9/2007 | Rodriguez et al. |
| 2008/0108499 | A1 | | 5/2008 | Coates et al. |
| 2009/0036725 | A1 | | 2/2009 | Wu et al. |
| 2009/0043100 | A1 | | 2/2009 | Kondo et al. |
| 2009/0099381 | A1 | | 4/2009 | Katsuki et al. |
| 2009/0186995 | A1 | | 7/2009 | Canich et al. |
| 2009/0318640 | A1 | | 12/2009 | Brant et al. |
| 2009/0318644 | A1 | | 12/2009 | Brant et al. |
| 2010/0081808 | A1 | | 4/2010 | Kondo et al. |

(Continued)

FOREIGN PATENT DOCUMENTS

| CN | 101080399 | 11/2007 |
|---|---|---|
| CN | 101437827 | 5/2009 |

(Continued)

OTHER PUBLICATIONS

Busico et al. "Living Ziegler-Natta Polymerization: True or False?", Macromolecules Symposium, 226: 1-16, 2005.

(Continued)

*Primary Examiner* — Rip A Lee

(74) *Attorney, Agent, or Firm* — Daniel N. Lundeen; Lundeen & Lundeen PLLC

(57) ABSTRACT

A cyclopentadienyl-substituted Salan catalyst, a catalyst system comprising an activator and the cyclopentadienyl-substituted Salan catalyst, a process comprising contacting one or more olefins with the catalyst system, and polymers produced by the process are disclosed herein.

28 Claims, 1 Drawing Sheet

(56) References Cited

U.S. PATENT DOCUMENTS

| | | |
|---|---|---|
| 2010/0298510 A1 | 11/2010 | Crowther et al. |
| 2011/0124831 A1 | 5/2011 | Luo |
| 2011/0152497 A1 | 6/2011 | Allen et al. |
| 2011/0306740 A1 | 12/2011 | Nagy et al. |
| 2011/0319578 A1 | 12/2011 | Hanaoka et al. |
| 2012/0184676 A1 | 7/2012 | Gahleitner et al. |
| 2012/0245312 A1 | 9/2012 | Holtcamp et al. |
| 2012/0316302 A1 | 12/2012 | Stewart |
| 2013/0030135 A1 | 1/2013 | Hagadorn et al. |
| 2013/0066029 A1 | 3/2013 | Radlauer et al. |
| 2013/0096271 A1 | 4/2013 | Kol et al. |
| 2013/0253244 A1 | 9/2013 | Emett et al. |
| 2013/0310529 A1 | 11/2013 | Kol et al. |
| 2014/0039137 A1 | 2/2014 | Giesbrecht et al. |
| 2014/0039138 A1 | 2/2014 | Giesbrecht et al. |
| 2014/0039139 A1 | 2/2014 | Giesbrecht et al. |
| 2014/0039140 A1 | 2/2014 | Giesbrecht et al. |
| 2014/0039141 A1 | 2/2014 | Giesbrecht et al. |

FOREIGN PATENT DOCUMENTS

| | | | |
|---|---|---|---|
| EP | 1849775 | 10/2007 | |
| EP | 1849778 | 10/2007 | |
| EP | 2003135 | 12/2008 | |
| EP | 2532687 | 12/2012 | |
| JP | 2007284438 | 11/2007 | |
| WO | 9806727 | 2/1998 | |
| WO | 0236638 | 5/2002 | |
| WO | 03091292 | 11/2003 | |
| WO | 2004069881 | 8/2004 | |
| WO | 2007007893 | 1/2007 | |
| WO | 2009027516 | 3/2009 | |
| WO | 2011019474 | 2/2011 | |
| WO | 2011158241 | 12/2011 | |
| WO | 2012004680 | 1/2012 | |
| WO | 2012098521 | 1/2012 | |
| WO | WO 2012/098521 A1 * | 7/2012 | ............. C08F 10/00 |
| WO | 2013043796 | 3/2013 | |

OTHER PUBLICATIONS

Busico et al. "Reactivity of Secondary Metal-Alkyls in Catalytic Propene Polymerization: How Dormant Are 'Dormant Chains'?", Journal of the American Chemical Society, 127(6): 1608-1609, 2005.
Ciancaleone et al. "Activation of a Bis(Phenoxy-Amine) Precatalyst for Olefin Polymerization: First Evidence for an Outer Sphere Ion Pair With the Methylborate Counterion", Dalton Transactions, p. 8824-8827, 2009.
Ciancaleone et al. "Stucture-Activity Relationship in Olefin Polymerization Catalysis: Is Entropy the Key?", Journal of the American Chemical Society, JACS, 132: 13651-13653, 2010.
Tshuva et al. "Single-Step Synthesis of Salans and Substituted Salans by Mannich Condensation", Tetrahedron Letters, 42: 6405-6407, 2001.
Official Action Dated Sep. 6, 2013 U.S. Appl. No. 13/805,011.
Restriction Official Action Dated May 13, 2013 U.S. Appl. No. 13/805,011.
Notice of Allowance Dated Jul. 1, 2014 U.S. Application No. 13/805,011.
Communication Pursuant to Article 94(3) EPC Dated Mar. 14, 2014 From the European Patent Office Re. Application No. 11736169.1.
Communication Relating to the Results of the Partial International Search Dated Apr. 19, 2012 From the International Searching Authority Re. Application No. PCT/IB2012/050267.
Corrected International Search Report and the Written Opinion Dated Sep. 25, 2012 From the International Searching Authority Re. Application No. PCT/IB2012/050267.
International Search Report and the Written Opinion Dated Jun. 19, 2012 From the International Searching Authority Re. Application No. PCT/IB2012/050267.
Office Action Dated Jul. 28, 2014 From the State Intellectual Property Office of the People's Republic of China Re. Application No. 201180039237.5.
Search Report Dated Jul. 28, 2014 From the State Intellectual Property Office of the People's Republic of China Re. Application No. 201180039237.5.
International Preliminary Report and the Written Opinion on Patentability Dated Jan. 3, 2013 From the International Bureau of WIPO Re. Application No. PCT/IL2011/000482.
International Search Report Dated Dec. 5, 2011 From the International Searching Authority Re. Application No. PCT/IL2011/000482.
International Preliminary Report and Written Opinion on Patentability Dated Jul. 23, 2013 From the International Bureau of WIPO Re. Application No. PCT/IB2012/050267.
Office Action Dated Jul. 28, 2014 From the State Intellectual Property Office of the People's Republic of China Re. Application No. 201180039237.5 Translation Into English.
Sanz et al. "Monocyclopentadienyl Bis(phenoxo-imino) Zirconium Complexes as Precatalyst Species for Olefin Polymerization. Stereospecific Methylation of an Imino Group with Formation of a Zirconium-amido Bond", Organometallics, 23: 5324-5331, 2004.
Allard et al., "Sequential Phenolate Oxidations in Octahedral Cobalt (III) Complexes with [N1O3] Ligands", European Journal of Inorganic Chemistry 2012, 29: 4622-4631.
Rajendiran et al., "Cleavage of Proteins by a Mixed-Ligand Copper (II) Phenolate Complex: Hydrophobicity of the Diimine Coligand Promotes Cleavage", Inorg. Chem., 2007, 46: 10446-10448.
Plass "Synthese, Struktur und Oxotransferreaktionen von Dioxomolybdan (VI)—Komplexen mit mehrzahnigen Aminoalkoholen als Liganden", Z. anorg. allg. Chem., 623 (1997) 997-1005.
Arredondo, Yolanda et al., Non-Catalyzed C-Alkylation of Phenols with Cyclic Secondary Alkyl Bromies, Synthetic Communications, 1996, vol. 26, No. 21, pp. 3885-3895.
Bryliakov, K. et al, Titanium-Salan-Catalyzed Asymmetric Oxidation of Sulfides and Kinetic Resolution of Sulfoxides with H2O2 as the Oxidant, Eur. J. Org. Chem., 2008, pp. 3369-3376.
Busico, Vincenzo et al, New Evidence on the Nature of the Active Sites in Heterogeneous Ziegler-Natta Catalysts for Propene Polymerization, 1997, Macromolecules, vol. 30, pp. 4786-4790.
Busico, Vincenzo et al., Mimicking Ziegler-Natta Catalysts in Homogeneous Phase, 1 C2-Symmetric Octahedral Zr (IV) Complexes with Tetradentate [ONNO]-Type Ligands, Macromol. Rapid Commun. 2001, vol. 22, No. 17, pp. 1405-1409.
Busico, Vincenzo et al., The first Molecularly Characterized Isotactic Polypropylene-block-polyethylene Obtained via "Quasi-Living" Insertion Polymerization, Macromolecules, 2003, vol. 36, No. 11, pp. 3806-3808.
Busico, Vincenzo et al., Block Copolymers of Highly Isotactic Polypropylene via Controlled Ziegler-Natta Polymerization, Macromolecules, 2004, vol. 37, No. 22, pp. 8201-8203.
Busico, Vincenzo et al., Design of stereoselective Ziegler—Natta propene polymerization catalysts, PNAS, 2006, vol. 103, No. 42, pp. 15321-15326.
Ciancaleoni, Gianluca et al., Structure/Properties Relationship for Bis{phenoxyamine}Zr(IV)-Based Olefin Polymerization Catalysts: A Simple OFT Model to Predict Catalytic Activity, Macromolecules, 2012, vol. 45, pp. 4046-4053.
Cipullo, Roberta et al., Improving the Behavior of Bis(phenoxyamine) Group 4 Metal Catalysts for Controlled Alkene Polymerization, 2009, Macromolecules, vol. 42, pp. 3869-3872.
Clarkson, Guy et al., Group 4 catalysts for ethene polymerization containing tetradentate salicylaldiminato ligands, 2006, Dalton Trans., pp. 5484-5491.
Cohen, AD et al., Construction of C1-symmetric zirconium complexes by the design of new Salan ligands. Coordination chemistry and preliminary polymerisation catalysis studies, Chem. Commun, 2008, pp. 2149-2151.
Cohen, AD et al., C1-Symmetric Zirconium Complexes of [ONNO#]-Type Salan Ligands: Accurate Control of Catalyst Activity, Isospecificity, and Molecular Weight in 1-Hexene Polymerization, Organometallics, 2009, vol. 28, No. 5, pp. 1391-1405.

(56) References Cited

OTHER PUBLICATIONS

Cohen, AD et al., Same Ligand, Different Metals: Diiodo-Salan Complexes of the Group 4 Triad in Isospecific Polymerization of 1-Hexene and Propylene, Macromolecules, 2010, vol. 43, No. 4, pp. 1689-1691.
Corradini, Paolo et al., Do New Century Catalysts Unravel the Mechanism of Stereocontrol of Old Ziegler-Natta Catalysts?, Accounts of Chemical Research, 2004, vol. 37, No. 4, pp. 231-241.
Demetgul, Cahit et al., Synthesis and characterization of a Schiff base derived from 2-aminobenzylamine and its Cu(II) complex: electropolymerization of the complex on a platinum electrode, Journal of Coordination Chemistry, 2010, vol. 63, No. 12, pp. 2181-2191.
Egami, Hiromichi et al., Fe(salan)-Catalyzed Asymmetric Oxidation of Sulfides with Hydrogen Peroxide in Water, 2007, J. Am. Chem. Soc., vol. 129, pp. 8940-8941.
Egami, Hiromichi et al., Nb(salan)-Catalyzed Asymmetric Epoxidation of Allylic Alcohols with Hydrogen Peroxide, 2008, J. Am. Chem. Soc., vol. 47, pp. 5171-5174.
Egami, Hiromichi et al., Oxidation Catalysis of Nb(Salan) Complexes: Asymmetric Epoxidation of Allylic Alcohols Using Aqueous Hydrogen Peroxide as an Oxidant, 2010, J. Am. Chem. Soc., vol. 132, pp. 5886-5895.
Egami, Hiromichi et al., Enantioenriched Synthesis of C1-Symmetric BINOLs: Iron-Catalyzed Cross-Coupling of 2-Naphthols and Some Mechanistic Insight, 2010, J. Am. Chem. Soc., vol. 132, pp. 13633-13635.
Gendler, Shimrit, et al., Titanium and Zirconium Complexes of Robust Salophan Ligands. Coordination Chemistry and Olefin Polymerization Catalysis, J. Am. Chem. Soc., 2008, vol. 130, pp. 2144-2145.
Groysman, Stanislav et al., Salophan Complexes of Group IV Metals, Eur. J. Inorg. Chem. 2005, pp. 2480-2485.
Kondo, Shoichi et al., A $\mu$-Oxo-$\mu$-$\eta$2 :$\eta$2-Peroxo Titanium Complex as a Reservoir of Active Species in Asymmetric Epoxidation Using Hydrogen Peroxide, 2008, Agnew. Chem. Int. Ed., vol. 47, pp. 10195-10198.
Lamberti, Marina et al., Mechanism of stereospecific polymerization of $\alpha$-olefins by late-transition metal and octahedral group 4 metal catalysts, Coord. Chem. Rev. vol. 253, 2009, pp. 2082-2097.
Leflon, P. et al., Determination of aluminum in bone in haemodialyzed patients, using inductively coupled argon plasma emission spectrometry, Clinica Chimica Acta, 1990, vol. 191, issues 1-2, pp. 31-38.
Manna, Cesar M. et al., Markedly different cytotoxicity of the two enantiomers of C2-symmetrical Ti(IV) phenolato complexes; mechanistic implications, 2010, Dalton Trans., vol. 39, pp. 1182-1184.
Matsumoto, Kazuhiro et al., Asymmetric catalysis of metal complexes with non-planar ONNO ligands: salen, salalen and salan, Chem. Commun., 2007, pp. 3619-3627.
Matsumoto, Kazuhiro et al., Asymmetric epoxidation of olefins catalyzed by Ti(salan) complexes using aqueous hydrogen peroxide as the oxidant, 2008, Pure and Applied Chemistry, vol. 80, pp. 1071-1077.
Matsumoto, Kazuhiro et al., Highly Enantioselective Epoxidation of Styrenes Catalyzed by Proline-Derived C1-Symmetric Titanium(Salan) Complexes, Angew. Chem. Int. Ed. 2009, vol. 48, pp. 7432-7435.
Meker, Sigalit. et al., Major impact of N-methylation on cytotoxicity and hydrolysis of salan Ti(IV) complexes: sterics and electronics are intertwined, 2011, Dalton Trans., vol. 40, pp. 9802-9809.
Nakano, Koji et al., Alternating Copolymerization of Cyclohexene Oxide with Carbon Dioxide Catalyzed by (salalen) CrCl Complexes, Macromelecules, 2009, vol. 42, pp. 6972-6980.
Press, Konstantin et al., Salalen Titanium Complexes in the Highly Isospecific Polymerization of 1-Hexene and Propylene, Angew. Chem., Int. Ed., 2011, vol. 50, pp. 3529-3532.
Press, Konstantin et al., Zirconium and hafnium Salalen complexes in isospecific polymerisation of propylene, Dalton Trans., 2013, vol. 42, pp. 9096-9103.

Sawada, Yuji, et al., Titanium—Salan-Catalyzed Asymmetric Epoxidation with Aqueous Hydrogen Peroxide as the Oxidant, Agnew. Chem. Int. Ed., 2006, vol. 45, pp. 3478-3480.
Segal, Sharon et al., Isospecific Polymerization of Vinylcyclohexane by Zirconium Complexes of Salan Ligands, Macromolecules, 2008, vol. 41, No. 5, pp. 1612-1617.
Segal, Sharon et al., Zirconium and Titanium Diamine Bis(phenolate) Catalysts for $\alpha$-Olefin Polymerization: From Atactic Oligo(1-hexene) to Ultrahigh-Molecular-Weight Isotactic Poly(1-hexene), Organomellics, 2005, vol. 24, No. 2, pp. 200-202.
Sergeeva, Ekaterina et al., Salan ligands assembled around chiral bipyrrolidine: predetermination of chirality around octahedral Ti and Zr centres, Chem. Commun, 2009, pp. 3053-3055.
Sergeeva, Ekaterina et al., 2,2'-Bipyrrolidine versus 1,2-Diaminocyclohexane as Chiral Cores for Helically Wrapping Diamine- Diolate Ligands, Inorganic Chemistry, 2009, vol. 48, No. 17, pp. 8075-8077.
Seyforth, Dietmar, Alkyl and Aryl Derivatives of the Alkali Metals: Strong Bases and Reactive Nucleophiles. 2. Wilhelm Schlenk's Organoalkali-Metal Chemistry. The Metal Displacement and the Transmetalation Reactions. Metalation of Weakly Acidic Hydrocarbons. Superbases, Organometallics, 2009, vol. 28, pp. 2-33.
Stopper, Ayellet et al., Ring-Opening Polymerization of Lactide with Zr Complexes of {ONSO} Ligands: From Heterotactically Inclined to Isotactically Inclined Poly(lactic acid), Macromelecules, 2012, vol. 45, pp. 698-704.
Strianese M., et al., A Comparative Study on the Polymerization of $\alpha$-Olefins Catalyzed by Salen and Salan Zirconium ComplexesMacromol. Chem. Phys. 2008, vol. 209, pp. 585-592.
Talarico, Giovanni et al., Origin of the Regiochemistry of Propene Insertion at Octahedral col. 4 Polymerization Catalysts: Design or Serendipity?, J. Am. Chem. Soc., 2003, vol. 125, pp. 7172-7173.
Tshuva, Edit Y. et al., Isospecific Living Polymerization of 1-Hexene by a Readily Available Nonmetallocene C2-Symmetrical Zirconium Catalyst, J. Am. Chem. Soc., 2000, vol. 122, pp. 10706-10707.
Yeori et al., Salalen: a hybrid Salan/Salen tetradentate [ONNO]-type ligand and its coordination behavior with group IV metals, Inorg. Chem. Commun., vol. 7, 2004, pp. 280-282.
Yeori, Adi et al., Diastereoisomerically Selective Enantiomerically Pure Titanium Complexes of Salan Ligands: Synthesis, Structure, and Preliminary Activity Studies, Inorganic Chemistry, 2005, vol. 44, No. 13, pp. 4466-4468.
Yeori, Adi et al., Diastereomerically-Specific Zirconium Complexes of Chiral Salan Ligands: Isospecific Polymerization of 1-Hexene and 4-Methyl-1-pentene and Cyclopolymerization of 1,5-Hexadiene, J . Am. Chem. Soc, 2006, vol. 128, pp. 13062-13063.
Yeori, Adi et al., Cyclopolymerization of 1,5-Hexadiene by Enantiomerically-Pure Zirconium Salan Complexes. Polymer Optical Activity Reveals $\alpha$-Olefin Face Preference, Macromolecules, 2007, vol. 40, No. 24, pp. 8521-8523.
Zucchini, U. et al., Synthesis and Properties of Some Titanium and Zirconium Benzyl Derivatives, J. Organomet. Chem., 1971, vol. 26, pp. 357-372.
PCT/US2013/046538 International Search Report and Written Opinion, Nov. 8, 2013.
PCT/US2013/046582 International Search Report and Written Opinion, Nov. 5, 2013.
PCT/US2013/046601 International Search Report and Written Opinion, Nov. 13, 2013.
PCT/IL2011/000482 International Search Report and Written Opinion, Jan. 13, 2013.
Berkessel, Albrecht et al., Ligands: Highly Enantioselective Titanium in Situ Catalysts for Asymmetric Epoxidation with Aqueous Hydrogen Peroxide, Adv. Synth Catal, 2007, vol. 349, pp. 2385-2391.
Whitelaw, Emma L. et al., Group 4 Salalen Complexes and Their Application for the Ring-Opening Polymerization of rac-Lactide, Inorg. Chem., 2010, vol. 49, pp. 7176-7181.
PCT/US2013/69419 International Search Report and Written Opinion, Mar. 7, 2013.
PCT/US2013/46569 International Search Report and Written Opinion, Jun. 13, 2014.
PCT/US2014/041362—ISR and WO, Oct. 1, 2014.

(56) References Cited

OTHER PUBLICATIONS

PCT/US2014/039786—ISR and WO, Sep. 29, 2014.
PCT/US2014/39766—ISR and WO, Oct. 31, 2014.
Immel et al., Cytotoxic dinuclear titanium-salan complexes: Stuctural and biological characterization, Journal of Inorganic Biochemistry, 2012, vol. 106, pp. 68-75.
PCT/US2013/046615 International Search Report and Written Opinion, Nov. 13, 2013.
PCT/US2013/053363 International Search Report and Written Opinion, Dec. 20, 2013.
U.S. Appl. No. 14/690,146 Office Action dated Nov. 10, 2015.
U.S. Appl. No. 14/406,414 Office Action dated Jul. 9, 2015.
U.S. Appl. No. 13/921,923 Office Action dated Jul. 17, 2015.

* cited by examiner

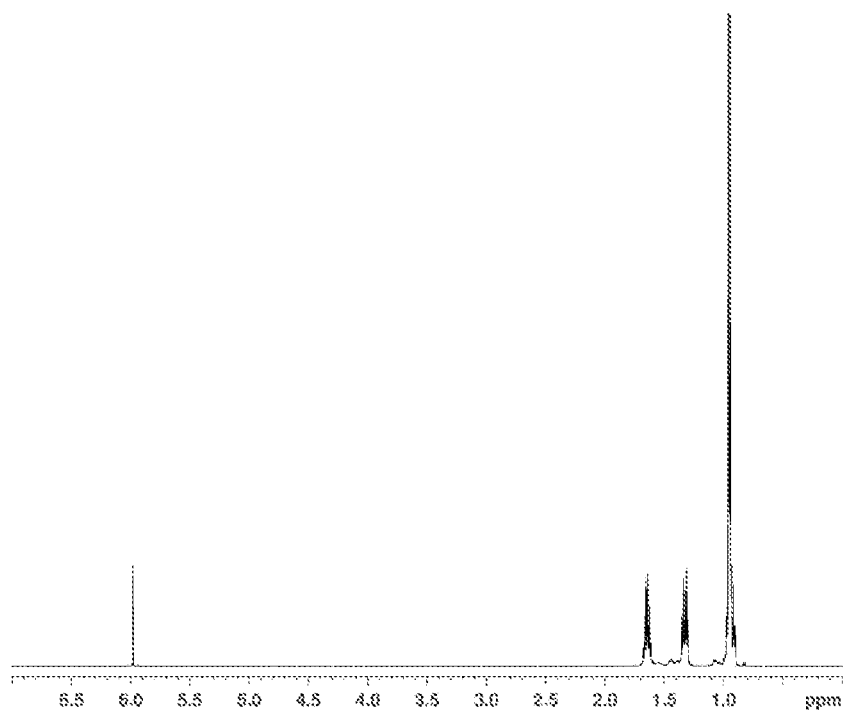

CYCLOPENTADIENYL-SUBSTITUTED SALAN CATALYSTS

RELATED APPLICATIONS

This application claims priority to and the benefit of provisional applications U.S. 61/915,924, filed Dec. 13, 2013, and U.S. 61/982,823, filed Apr. 22, 2014, which are fully incorporated by reference herein.

FIELD OF THE INVENTION

This invention relates to Salan catalyst compounds and catalyst systems, processes utilizing such catalysts, and polymers produced thereby.

BACKGROUND OF THE INVENTION

Olefin polymerization catalysts are of great use in industry. Hence there is interest in finding new catalyst systems that increase the commercial usefulness of the catalyst and allow the production of polymers having improved properties.

There is a need in the art for new and improved catalysts and catalyst systems to obtain new and improved polyolefins, polymerization processes, and the like. Accordingly, there is a need in the art for new and improved catalyst systems for the polymerization of olefins, to achieve specific polymer properties such as high tacticity, high molecular weight or a combination thereof.

SUMMARY OF THE INVENTION

The instant disclosure is directed to catalyst compounds and catalyst systems comprising such compounds, processes for the preparation of the catalyst compounds and systems, and processes for the polymerization of olefins using such catalyst compounds and systems.

In an embodiment according to the invention, a catalyst compound is represented by the formula:

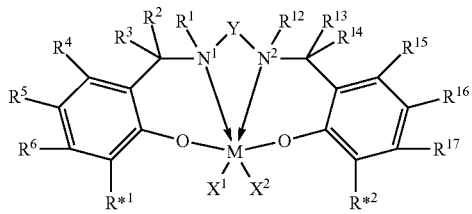

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

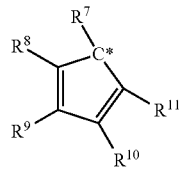

wherein C* indicates an attachment carbon of the radical;

each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;

$R^7$ is a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

In some embodiments according to the invention, at least one of $R^{*1}$ and $R^{*2}$ independently comprises a substituted or unsubstituted $C_4$-$C_{20}$ aliphatic radical or a substituted or unsubstituted $C_4$-$C_{20}$ alicyclic radical. In some embodiments according to the invention at least one of $R^{*1}$ and $R^{*2}$ independently comprises an electron withdrawing functional group such as, for example, —$NO_2$, —$CF_3$, —$CCl_3$, —$CBr_3$, —$CI_3$, —CN, —$NCR^\alpha$, —$SO_3H$, —COOH, —CHO, —F, —Cl, —Br, —I, —$COOR^\alpha$, —$COR^\alpha$, —$NR^\alpha_3{}^+$, or a combination thereof, wherein each $R^\alpha$ is independently hydrogen, a $C_1$-$C_{20}$ alkyl radical, or the like.

In some embodiments according to the invention, both of $R^{*1}$ and $R^{*2}$ independently comprise a substituted or unsubstituted cyclopentadienyl radical, wherein one of $R^{*1}$ and $R^{*2}$ independently comprises a substituted or unsubstituted cyclopentadienyl radical represented by the formula:

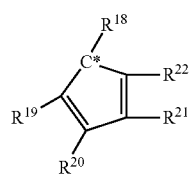

wherein C* indicates an attachment carbon of the radical, wherein each of $R^{18}$, $R^{19}$, $R^{20}$, $R^{21}$, and $R^{22}$ is, independently, hydrogen, a $C_1$-$C_{40}$ hydrocarbyl radical, a functional group comprising elements from Groups 13 to 17 of the periodic table of the elements, two or more of $R^{19}$, $R^{20}$, $R^{21}$, and $R^{22}$ independently join together to form a $C_4$ to $C_{62}$ cyclic or polycyclic ring structure, or a combination thereof.

In an embodiment according to the invention, a catalyst compound is represented by the formula:

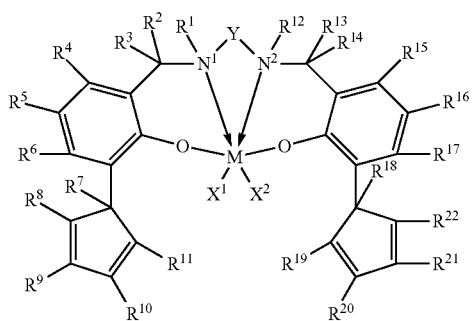

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{19}$, $R^{20}$, $R^{21}$, and $R^{22}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{19}$, $R^{20}$, $R^{21}$, and $R^{22}$ independently join together to form a $C_4$ to $C_{62}$ cyclic or polycyclic ring structure, or a combination thereof;
each $R^7$ and $R^{18}$ is, independently, a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

In an embodiment according to the invention, a catalyst compound is represented by the formula:

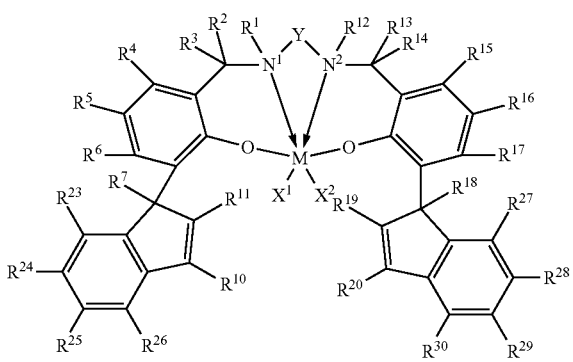

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ independently join together to form a $C_4$ to $C_{62}$ cyclic or polycyclic ring structure, or a combination thereof;
each $R^7$ and $R^{18}$ is, independently, a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

In an embodiment according to the invention, a catalyst compound is represented by the formula:

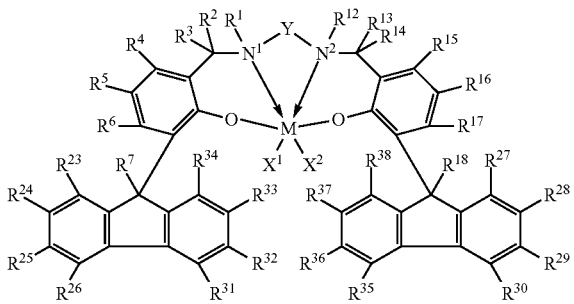

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ independently join together to form a $C_4$ to $C_{62}$ cyclic or polycyclic ring structure, or a combination thereof;
each $R^7$ and $R^{18}$ is, independently, a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

In an embodiment according to the invention, a catalyst system comprises an activator and a catalyst compound represented by the formula:

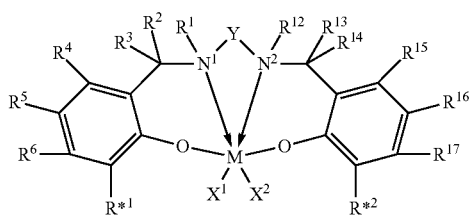

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

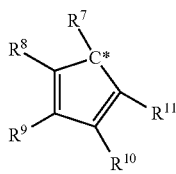

wherein C* indicates an attachment carbon of the radical;

each $R^1, R^2, R^3, R^4, R^5, R^6, R^8, R^9, R^{10}, R^{11}, R^{12}, R^{13}, R^{14}, R^{15}, R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1, R^2, R^3, R^4, R^5, R^6, R^8, R^9, R^{10}, R^{11}, R^{12}, R^{13}, R^{14}, R^{15}, R^{16}$, and $R^{17}$ independently join together to form a $C_4$ to $C_{62}$ cyclic or polycyclic ring structure, or a combination thereof;

$R^7$ is a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

In an embodiment of the invention, a process comprises contacting one or more olefins with a catalyst system at a temperature, a pressure, and for a period of time sufficient to produce a polyolefin, the catalyst system comprising an activator and a catalyst compound represented by the formula:

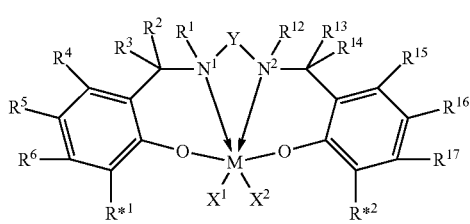

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

wherein each of $R^{*1}$ and $R^{*2}$ independently comprise a bulky functional group, an electron withdrawing group, or a combination thereof, and wherein at least one of $R^{*1}$ and $R^{*2}$ independently comprise a cyclopentadienyl radical having the structure:

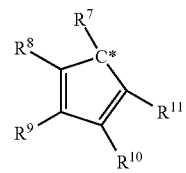

wherein C* indicates an attachment carbon of the radical;

each $R^1, R^2, R^3, R^4, R^5, R^6, R^8, R^9, R^{10}, R^{11}, R^{12}, R^{13}, R^{14}, R^{15}, R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1, R^2, R^3, R^4, R^5, R^6, R^8, R^9, R^{10}, R^{11}, R^{12}, R^{13}, R^{14}, R^{15}, R^{16}$, and $R^{17}$ independently join together to form a $C_4$ to $C_{62}$ cyclic or polycyclic ring structure, or a combination thereof;

$R^7$ is a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

In some embodiments according to the invention, one of $R^{*1}$ and $R^{*2}$ independently comprises a substituted or unsubstituted $C_4$-$C_{20}$ aliphatic or alicyclic radical. In some embodiments according to the invention at least one of $R^{*1}$ and $R^{*2}$ independently comprises an electron withdrawing functional group such as, for example, $-NO_2$, $-CF_3$, $-CCl_3$, $-CBr_3$, $-CI_3$, $-CN$, $-NCR^\alpha$, $-SO_3H$, $-COOH$, $-CHO$, $-F$, $-Cl$, $-Br$, $-I$, $-COOR^\alpha$, $-COR^\alpha$, $-NR^\alpha_3{}^+$, or a combination thereof, wherein each $R^\alpha$ is independently hydrogen or a $C_1$-$C_{20}$ alkyl radical, or the like. In some embodiments according to the invention, both $R^{*1}$ and $R^{*2}$ independently comprise a substituted or unsubstituted cyclopentadienyl radical, wherein one of $R^{*1}$ and $R^{*2}$ independently comprises a substituted or unsubstituted cyclopentadienyl radical represented by the formula:

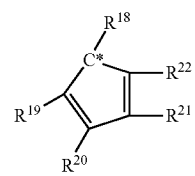

wherein C* indicates an attachment carbon of the radical, wherein each of $R^{18}$, $R^{19}$, $R^{20}$, $R^{21}$, and $R^{22}$ is, independently, hydrogen, a $C_1$-$C_{40}$ hydrocarbyl radical, a functional group comprising elements from Groups 13 to 17 of the periodic table of the elements, two or more of $R^{19}$, $R^{20}$, $R^{21}$, and $R^{22}$ independently join together to form a $C_4$ to $C_{62}$ cyclic or polycyclic ring structure, or a combination thereof.

BRIEF DESCRIPTION OF THE DRAWINGS

FIG. 1 shows $^1$H NMR spectra for a highly isotactic polypropylene prepared using a zirconium catalyst in the examples below according to an embodiment of the invention.

DETAILED DESCRIPTION

For the purposes of this invention and the claims thereto, the numbering scheme for the Periodic Table Groups is used as in Chem. Eng. News, 1985, 63, 27. Therefore, a "Group 4 metal" is an element from Group 4 of the Periodic Table.

In the structures depicted throughout this specification and the claims, a solid line indicates a bond, an arrow indicates that the bond may be dative, and each dashed line represents a bond having a varying degree of covalency and a varying degree of coordination.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13 to 17 of the periodic table of the elements. For purposes herein a partially aromatic ring system comprises a cyclic system which includes at least one sp3 hybridized carbon atom capable of geminal substitution. Examples of partially aromatic ring systems include tetrahydrofuran, indene, fluorene and the like. The sp$^3$ hybridized carbon atom by which the radical is attached to the rest of the compound, is indicated for purposes herein with an asterisk (C*), as in the following examples:

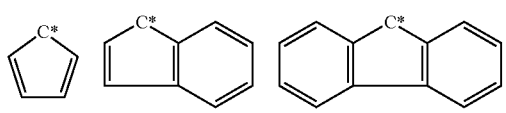

In addition two or more such hydrocarbyl radicals may together form a fused ring system, including partially or fully hydrogenated fused ring systems, which may include heterocyclic radicals.

For purposes herein, a fluorenyl or substituted fluorenyl radical is represented by the formula:

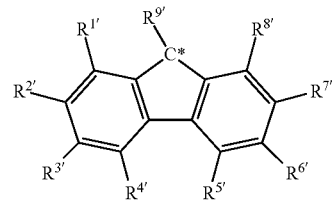

wherein each $R^{1'}$ through $R^{9'}$ is, independently, hydrogen, a $C_1$-$C_{40}$ hydrocarbyl radical, a functional group comprising elements from Group 13 to 17 of the periodic table of the elements, two or more of $R^{1'}$ to $R^{9'}$ independently join together to form a $C_4$ to $C_{62}$ cyclic or polycyclic ring structure, or a combination thereof.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group; ethyl alcohol is an ethyl group, which is the base structure, substituted with an —OH functional group; and pyridine is a phenyl group having a carbon in the base structure of the benzene ring substituted with a nitrogen atom.

For purposes herein, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butyryl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Ranges described herein (such as $C_1$ to $C_{10}$ hydrocarbyl radical), include the species described above having the requisite number of carbon atoms, for example, "$C_1$ to $C_{10}$ hydrocarbyl radical" includes methyl, ethyl, ethenyl and isomers of propyl, butyl, pentyl, hexyl, heptyl, octyl, nonyl, and decyl.

For purposes herein, hydrocarbyl radicals may also include isomers of saturated, partially unsaturated and aromatic cyclic structures wherein the radical may additionally be subjected to the types of substitutions described above.

The terms "aryl", "aryl radical", and/or "aryl group" refer to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals, as well as moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, —I, F), O, S, Se, Te, $NR^{\ddagger}_x$, $OR^{\ddagger}$, $SeR^{\ddagger}$, $TeR^{\ddagger}$, $PR^{\ddagger}_x$, $AsR^{\ddagger}_x$, $SbR^{\ddagger}_x$, $SR^{\ddagger}$, $BR^{\ddagger}_x$, $SiR^{\ddagger}_x$, $GeR^{\ddagger}_x$, $SnR^{\ddagger}_x$, $PbR^{\ddagger}_x$, and/or the like, wherein each $R^{\ddagger}$ is independently hydrogen or a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

For purposes herein, a supported catalyst and/or activator refers to a catalyst compound, an activator, or a combination thereof located on, in or in communication with a support wherein the activator, the catalyst compound, or a combination thereof are deposited on, vaporized with, bonded to, incorporated within, adsorbed or absorbed in, adsorbed or absorbed on, the support.

For purposes herein, an electron withdrawing functional group is an atom or functional group that removes electron density from a conjugated π system via resonance or inductive electron withdrawal, for example, thus making the π system more electrophilic. Examples of electron withdrawing groups include nitro groups (—$NO_2$), quaternary amine groups (—$NR_3^+$), trihalide groups (—$CF_3$, —$CCl_3$, —$CBr_3$, —$CI_3$), cyano groups (—CN), isocyano groups ($R^{\alpha}$CN—); sulfonates (—$SO_3H$), carboxylic acids (—COOH), esters (—COOR), aldehydes (—CHO), and/or ketones (—$COR^{\alpha}$), or a combination thereof, or the like, wherein each $R^{\alpha}$ is independently hydrogen or a $C_1$-$C_{20}$ alkyl radical.

Where reference is made herein to two substituents joining together to form a cyclic or polycyclic ring structure, one substituent is directly bridged to another substituent when the two substituents together form only a covalent bond containing no atoms, i.e., the substituents are not directly bridged if they together comprise a bridge of at least one atom.

For purposes herein a bulky functional group is defined as a functional group having a molecular size greater than or equal to an isopropyl moiety. Accordingly, for purposes herein a bulky functional group includes substituted or unsubstituted bulky aliphatic radicals having three carbons or more, bulky alicyclic radicals having three carbons or more, and/or bulky aromatic radicals having 5 carbons or more, each having a molecular size greater than or equal to an isopropyl moiety.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such as an Mn of less than 25,000 g/mol, or in an embodiment according to the invention, less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradec ene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4- vinylcyclohexane, 1,4-diallylcyclohexane, 1-allyl-5-vinylcyclooctane, and 1,5-diallylcyclooctane.

The terms "catalyst", "catalyst compound", and "transition metal compound" are defined to mean a compound capable of initiating polymerization of monomers to polymers under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate polymerization by scavenging impurities. Some scavengers may also act as activators and may be referred to as co-activators. A co-activator, that is not a scavenger, may also be used in conjunction with an activator to form an active catalyst. In an embodiment according to the invention, a co-activator can be pre-mixed with the catalyst compound to form an alkylated catalyst compound.

As used herein, Mn is number average molecular weight determined by $^1$H NMR as described herein, Mw is weight average molecular weight and Mz is z average molecular weight determined by gel permeation chromatography (GPC) as described herein, wt % is weight percent, and mol % is mole percent. In the alternative, when GPC is inaccurate for low molecular weight species, Mw and Mn may be determined by gas chromatography (GC) for polymers having a kinematic viscosity at 100° C. as determined according to ASTM D445 (KV100) less than 10 cSt, and by GPC for KV100 of 10 cSt or higher. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bn is benzyl, THF is tetrahydrofuran, Mes is mesityl, also known as 1,3,5-trimethylbenzene, Tol is toluene, Flu is fluorenyl, TMS is trimethylsilyl, TIBAL is tri-isobutylaluminum, TNOAL is triisobutyl n-octylaluminum, MAO is methylalumoxane, MOMO is methoxymethoxy (also referred to as methoxymethyl ether), N is nitrogen (including that $N^1$, $N^2$, $N^3$ and $N^4$ are each representative of a single nitrogen atom) and O is oxygen.

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, a Salan catalyst compound or a transition metal compound, and these terms are used interchangeably.

Catalyst Compounds

In an embodiment according to the invention, the catalyst comprises Group 3, 4, 5 and/or 6 monosubstituted (for a trivalent metal) or disubstituted (for a tetravalent metal) compounds supported by a tetradentate di-anionic Salan ligand, useful to polymerize olefins and/or α-olefins to produce polyolefins and/or poly(α-olefins). In an embodiment according to the invention, the catalyst compound is represented by the formula:

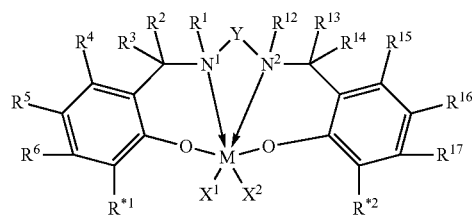

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

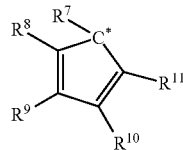

wherein C* indicates an attachment carbon of the radical; each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;
$R^7$ is a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

In some embodiments according to the invention, at least one of $R^{*1}$ and $R^{*2}$ independently comprises a substituted or unsubstituted $C_4$-$C_{20}$ aliphatic or alicyclic radical. In some embodiments according to the invention, at least one of $R^{*1}$ and $R^{*2}$ independently comprises an electron withdrawing functional group such as, for example, —NO$_2$, —CF$_3$, —CCl$_3$, —CBr$_3$, —CI$_3$, —CN, —SO$_3$H, —COOH, —CHO, —F, —Cl, —Br, —I, —COOR$^\alpha$, —COR$^\alpha$, —NR$^\alpha$$_3$$^+$, or a combination thereof, or the like, wherein each R$^\alpha$ is independently hydrogen or a C$_1$-C$_{20}$ alkyl radical. In some embodiments according to the invention, both R$^{*1}$ and R$^{*2}$ independently comprise a substituted or unsubstituted cyclopentadienyl radical, wherein one of R$^{*1}$ and R$^{*2}$ independently comprises a substituted or unsubstituted cyclopentadienyl radical represented by the formula:

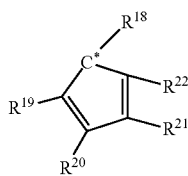

wherein C* indicates an attachment carbon of the radical, wherein each of R$^{18}$, R$^{19}$, R$^{20}$, R$^{21}$, and R$^{22}$ is, independently, hydrogen, a C$_1$-C$_{40}$ hydrocarbyl radical, a functional group comprising elements from Groups 13 to 17 of the periodic table of the elements, two or more of R$^{19}$, R$^{20}$, R$^{21}$, and R$^{22}$ independently join together to form a C$_4$ to C$_{62}$ cyclic or polycyclic ring structure, or a combination thereof.

In an embodiment according to the invention, the catalyst compound is represented by the formula:

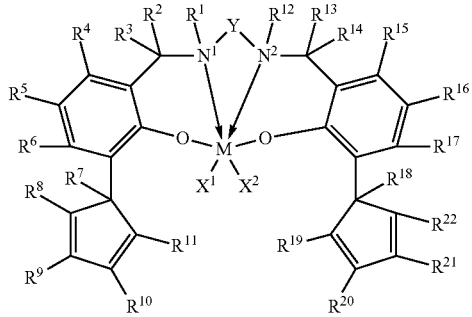

wherein each solid line represents a covalent bond and each arrow represents a bond having a varying degree of covalency and a varying degree of coordination;
wherein M is a Group 3, 4, 5 or 6 transition metal;
N$^1$ and N$^2$ are nitrogen;
O is oxygen;
each of X$^1$ and X$^2$ is, independently, a univalent C$_1$ to C$_{20}$ hydrocarbyl radical, a functional group comprising elements from Groups 13 to 17 of the periodic table of the elements, or X$^1$ and X$^2$ join together to form a C$_4$ to C$_{62}$ cyclic or polycyclic ring structure, provided however when M is trivalent X$^2$ is not present;
each R$^1$, R$^2$, R$^3$, R$^4$, R$^5$, R$^6$, R$^8$, R$^9$, R$^{10}$, R$^{11}$, R$^{12}$, R$^{13}$, R$^{14}$, R$^{15}$, R$^{16}$, R$^{17}$, R$^{19}$, R$^{20}$, R$^{21}$, and R$^{22}$ is, independently, hydrogen, a C$_1$-C$_{40}$ hydrocarbyl radical, a functional group comprising elements from Groups 13 to 17 of the periodic table of the elements, two or more of R$^1$, R$^2$, R$^3$, R$^4$, R$^5$, R$^6$, R$^8$, R$^9$, R$^{10}$, R$^{11}$, R$^{12}$, R$^{13}$, R$^{14}$, R$^{15}$, R$^{16}$, R$^{17}$, R$^{19}$, R$^{20}$, and R$^{22}$ independently join together to form a C$_4$ to C$_{62}$ cyclic or polycyclic ring structure, or a combination thereof;

each R$^7$ and R$^{18}$ is, independently, a C$_1$-C$_{40}$ hydrocarbyl radical or a functional group comprising elements from Groups 13 to 17 of the periodic table of the elements; and
Y is a divalent C$_1$ to C$_{20}$ hydrocarbyl radical.

In an embodiment according to the invention, at least one of R$^8$ and R$^9$, and R$^{11}$, R$^{19}$ and R$^{20}$ (when present), and R$^{21}$ and R$^{22}$ (when present) are independently joined together to form an aromatic or partially aromatic ring system.

In an embodiment according to the invention, at least one of R$^8$ and R$^9$, R$^{10}$ and R$^{11}$, R$^{19}$ and R$^{20}$ (when present) and R$^{21}$ and R$^{22}$ (when present) are independently joined together to form at least one six membered aromatic ring.

In an embodiment according to the invention, R$^8$ and R$^9$, and/or R$^{10}$ and R$^{11}$ are independently joined together to form an indenyl or fluorenyl ring system, R$^{19}$ and R$^{20}$ (when present), and/or R$^{21}$ and R$^{22}$ (when present) are independently joined together to form an indenyl or fluorenyl ring system, or a combination thereof.

In an embodiment according to the invention, each R$^7$ and R$^{18}$ is, independently, methyl, ethyl, propyl, butyl, pentyl, hexyl, octyl, nonyl, decyl, undecyl, dodecyl, phenyl, and isomers thereof, preferably methyl, phenyl, and or t-butyl.

In an embodiment according to the invention, Y is a divalent C$_1$-C$_{20}$ hydrocarbyl radical comprising a portion that comprises a linker backbone comprising from 1 to 18 carbon atoms linking or bridging between nitrogen atoms N$^1$ and N$^2$. In an embodiment according to the invention, the hydrocarbyl comprises O, S, S(O), S(O)$_2$, Si(R$^\#$)$_2$, P(R$^\#$), N or N(R$^\#$), wherein each R$^\#$ is independently hydrogen or a C$_1$-C$_{18}$ hydrocarbyl. In an embodiment according to the invention Y is —CH$_2$CH$_2$CH$_2$— derived from propylene.

In an embodiment according to the invention, Y is a divalent C$_1$ to C$_{12}$ aliphatic radical which may be cyclic, branched or linear.

In an embodiment according to the invention, Y is selected from the group consisting of methylene, ethyl, propyl, butyl, pentyl, hexyl, octyl, nonyl, decyl, undecyl, dodecyl, phenyl, and isomers thereof.

In an embodiment according to the invention, Y is ethylene (—CH$_2$CH$_2$—), 1,2-cyclohexylene, 1,2-phenylene, or 2-benzylene, i.e., the benzylene bridge structure N$^1$—Y—N$^2$ is represented by the formulae:

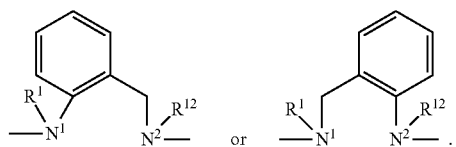

In an embodiment according to the invention, M is Hf, Ti, or Zr.

In an embodiment according to the invention, each of X$^1$ and X$^2$ (when X$^2$ is present) is, independently, a halogen or a C$_1$ to C$_7$ hydrocarbyl radical.

In an embodiment according to the invention, each of X$^1$ and X$^2$ (when X$^2$ is present) is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In an embodiment according to the invention, each of $X^1$ and $X^2$ (when $X^2$ is present) is a benzyl radical.

In an embodiment according to the invention, each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$ (and $R^{19}$, $R^{20}$, $R^{21}$, and $R^{22}$ when present), is, independently, hydrogen, a halogen, or a $C_1$ to $C_{30}$ hydrocarbyl radical.

In an embodiment according to the invention, each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$ (and $R^{19}$, $R^{20}$, $R^{21}$, and $R^{22}$ when present), is independently, hydrogen, a halogen, or a $C_1$ to $C_{10}$ hydrocarbyl radical.

In an embodiment according to the invention, a catalyst compound is represented by the formula:

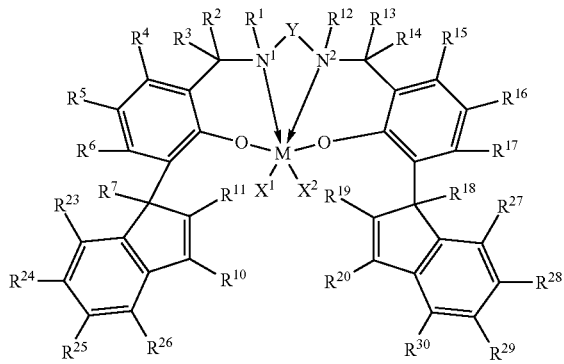

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ independently join together to form a $C_4$ to $C_{62}$ cyclic or polycyclic ring structure, or a combination thereof;

each $R^7$ and $R^{18}$ is, independently, a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

In an embodiment according to the invention, a catalyst compound is represented by the formula:

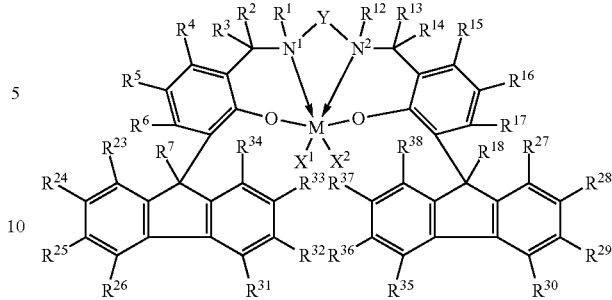

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ independently join together to form a $C_4$ to $C_{62}$ cyclic or polycyclic ring structure, or a combination thereof;

each $R^7$ and $R^{18}$ is, independently, a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

In an embodiment according to the invention, in the above catalyst compound:

$X^1$ and $X^2$ are benzyl radicals;

$R^1$, $R^5$, $R^7$, $R^{12}$, $R^{16}$, and $R^{18}$ are methyl radicals;

$R^2$, $R^3$, $R^4$, $R^6$, $R^{13}$, $R^{14}$, $R^{15}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are hydrogen; and Y is ethylene (—$CH_2CH_2$—), as represented by the formula:

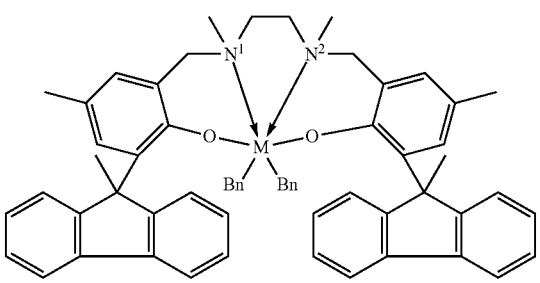

wherein M is Zr or Hf.

In an embodiment according to the invention, in the above catalyst compound:

X¹ and X² are benzyl radicals;

R¹, R⁵, R¹², and R¹⁶ are methyl radicals;

R⁷, and R¹⁸ are benzyl radicals;

R², R³, R⁴, R⁶, R¹³, R¹⁴, R¹⁵, R¹⁷, R²³, R²⁴, R²⁵, R²⁶, R²⁷, R²⁸, R²⁹, R³⁰, R³¹, R³², R³³, R³⁴, R³⁵, R³⁶, R³⁷, and R³⁸ are hydrogen; and Y is ethylene (—CH₂CH₂—), as represented by the formulae:

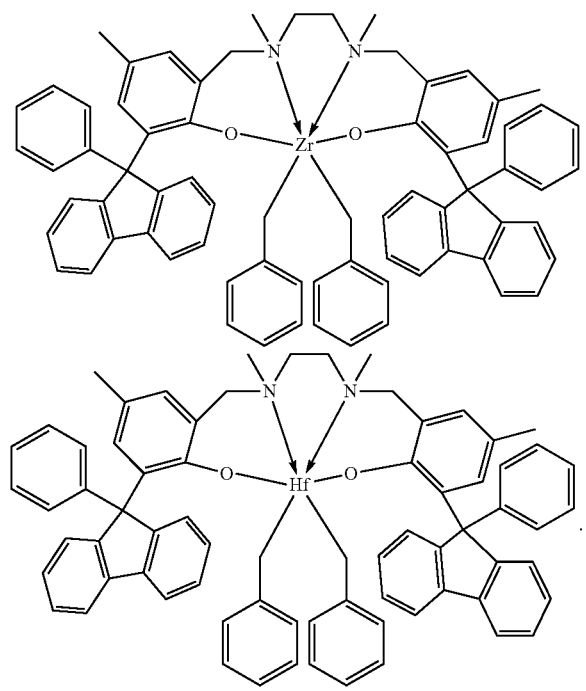

In an embodiment according to the invention, the catalyst compound is represented by the formula:

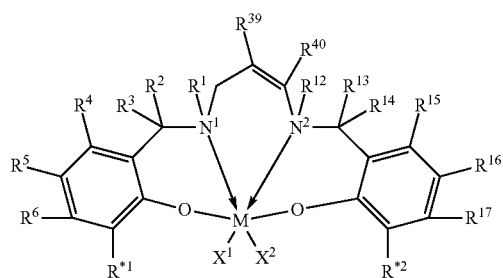

wherein M, N¹, N², X¹, X², O, each of R¹ through R¹⁷ and R*¹ and R*² are as defined above, and wherein each R³⁹ and R⁴⁰ is, independently, hydrogen, a C₁-C₄₀ hydrocarbyl radical, a functional group comprising elements from Groups 13 to 17 of the periodic table of the elements, or R³⁹ and R⁴⁰ join together to form a C₄ to C₆₂ cyclic or polycyclic ring structure, or a combination thereof.

In an embodiment according to the invention, the catalyst compound is represented by the formula:

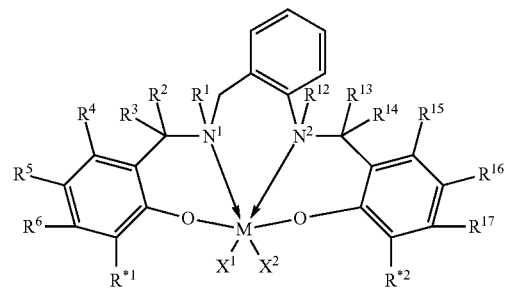

wherein M, N¹, N², X¹, X², O, each of R¹ through R¹⁷ and R*¹ and R*² are as defined above (i.e., Y is substituted or unsubstituted 2-benzylene or N¹—Y—N² is a substituted or unsubstituted 2-aminobenzylamine moiety). Accordingly, in an embodiment of the invention, the Salan ligand is asymmetrically substituted about the metal atom M.

In an embodiment according to the invention, the catalyst compound is represented by the formula:

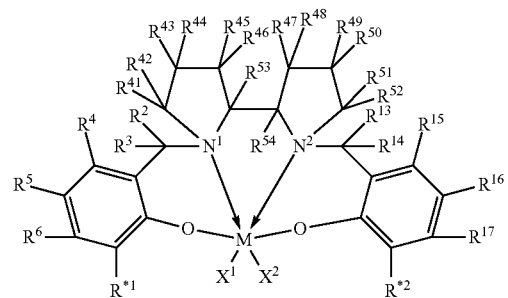

wherein M, N¹, N², X¹, X², O, R*¹ and R*² are as defined above and wherein each of R⁴¹, R⁴², R⁴³, R⁴⁴, R⁴⁵, R⁴⁶, R⁴⁷, R⁴⁸, R⁴⁹, R⁵⁰, R⁵¹, R⁵², R⁵³, and R⁵⁴ is, independently, hydrogen, a C₁-C₄₀ hydrocarbyl radical, a functional group comprising elements from Groups 13 to 17 of the periodic table of the elements, two or more of R⁴¹, R⁴², R⁴³, R⁴⁴, R⁴⁵, R⁴⁶, R⁴⁷, R⁴⁸, R⁴⁹, R⁵⁰, R⁵¹, R⁵², R⁵³, and R⁵⁴ independently join together to form a C₄ to C₆₂ cyclic or polycyclic ring structure, or a combination thereof. Accordingly, in an embodiment according to the invention N¹—Y—N² is a substituted or unsubstituted bipyrrolidine moiety, which may introduce chirality into the Salan ligand system, depending on the R*¹ and R*² compositions and/or substitution.

In an embodiment of the invention, a process comprises contacting one or more olefins with a catalyst system according to one or more embodiments at a temperature, a pressure, and for a period of time sufficient to produce a polyolefin. In an embodiment of the invention, the catalyst compound is disposed on a support.

In an embodiment the invention includes the polyolefin obtained by a process according to one or more embodiments disclosed herein. In an embodiment of the invention, the polyolefin comprises an ethylene polymer having an Mw of at least 500,000 g/mol. In an embodiment of the invention, the polyolefin comprises a propylene polymer having an isotacticity of at least 90%. In an embodiment of the invention, the polyolefin comprises an Mw of at least 500,000 g/mol.

In an embodiment according to the invention, the catalyst compound is represented by the formula:

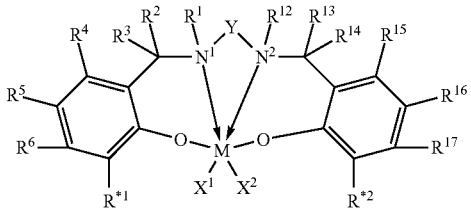

wherein each solid line represents a covalent bond and each dashed line represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{12}$, $R^{13}$, $R^{14}$, $R^{15}$, $R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;

Y is a divalent $C_1$ to $C_{20}$ hydrocarbyl radical; and wherein $R^{*1}$ is an independently substituted or unsubstituted cyclopentadienyl radical represented by the formulae:

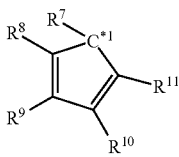

wherein $C^{*1}$ indicates the attachment carbon of the radical, and wherein $R^{*2}$ is an independently substituted or unsubstituted cyclopentadienyl radical represented by the formulae:

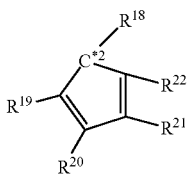

wherein $C^{*2}$ indicates the attachment carbon of the radical, wherein each of the radicals are independently attached to the corresponding phenyl ring via a single carbon-carbon bond between the phenyl ring and the cyclopentadienyl radical, wherein each $R^7$, $R^8$, $R^9$, $R^{10}$, $R^{11}$, $R^{18}$, $R^{19}$, $R^{20}$, $R^{21}$, and $R^{22}$ is independently, hydrogen, a $C_1$-$C_{40}$ hydrocarbyl radical, a functional group comprising elements from Groups 13 to 17 of the periodic table of the elements, two or more of $R^8$, $R^9$, $R^{10}$, $R^{11}$, $R^{19}$, $R^{20}$, $R^{21}$, and $R^{22}$ independently join together to form a $C_4$ to $C_{62}$ cyclic or polycyclic ring structure, or a combination thereof.

In an embodiment of the invention, $R^7$ and $R^{18}$ are each, independently, a $C_1$-$C_{40}$ hydrocarbyl radical or a functional group comprising elements from Groups 13 to 17 of the periodic table of the elements.

In an embodiment of the invention, substituents $R^{18}$ through $R^{22}$ are each identical to $R^7$ through $R^{11}$ respectively. In an embodiment of the invention, at least one of substituents $R^{18}$ through $R^{22}$ are dissimilar to $R^7$ through $R^{11}$ respectively such that the Salan ligand system is asymmetrical with respect to the metal atom.

In an embodiment of the invention, at least one of $R^{*1}$ and $R^{*2}$ independently comprises a bulky functional group comprising an aliphatic or alicyclic radical having from 3 to 20 carbon atoms. In an embodiment, at least one of $R^{*1}$ and $R^{*2}$ independently comprises a bulky functional group, comprising an iso-propyl radical, a substituted or unsubstituted cyclopentadienyl radical, a tertiary butyl radical, a cyclohexane radical, a hexose, a furanose, an adamantyl radical, and/or the like.

In an embodiment of the invention, at least one of $R^{*1}$ and $R^{*2}$ independently comprises an electron withdrawing functional group comprising one or more of a nitro group (—$NO_2$), a trihalide group (—$CF_3$, —$CCl_3$, —$CBr_3$, —$CI_3$), a cyano group (—CN), an isocyano group ($R^{\alpha}$CN—), a sulfate group (—$SO_3H$), a carboxylic acid group (—COOH), an aldehyde group (—CHO), a halogen (—F, —Cl, —Br, —I), an ester (—$COOR^{\alpha}$), a ketone (—$COR^{\alpha}$), and/or an ammonium group (—$NR^{\alpha}_3{}^+$), wherein each $R^{\alpha}$ is independently hydrogen or a $C_1$-$C_{20}$ alkyl radical. In an embodiment of the invention, at least one of $R^{*1}$ and $R^{*2}$ independently comprises a bulky functional group substituted with at least one electron withdrawing functional group.

In an embodiment according to the invention, at least one of $R^{*1}$ and $R^{*2}$ is independently selected from the group consisting of substituted or unsubstituted radicals comprising any one of the formulae:

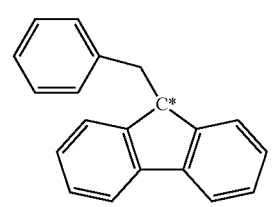
(i)

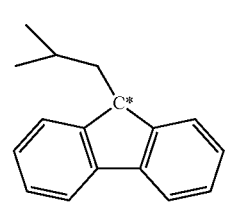
(ii)

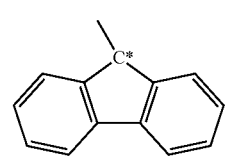
(iii)

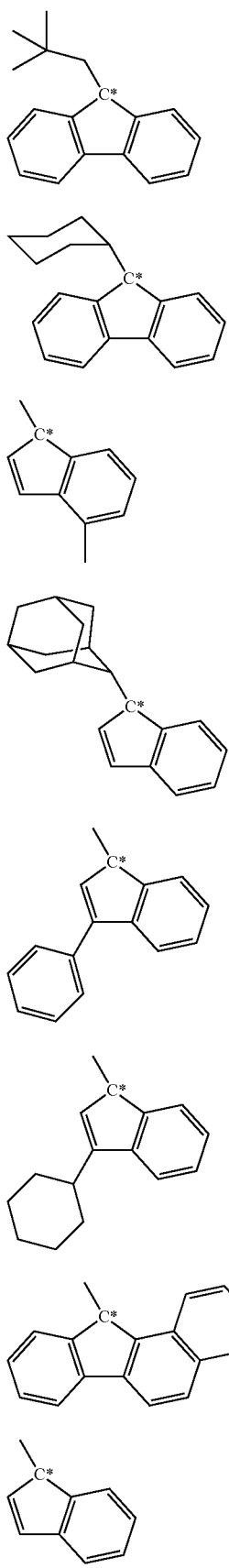
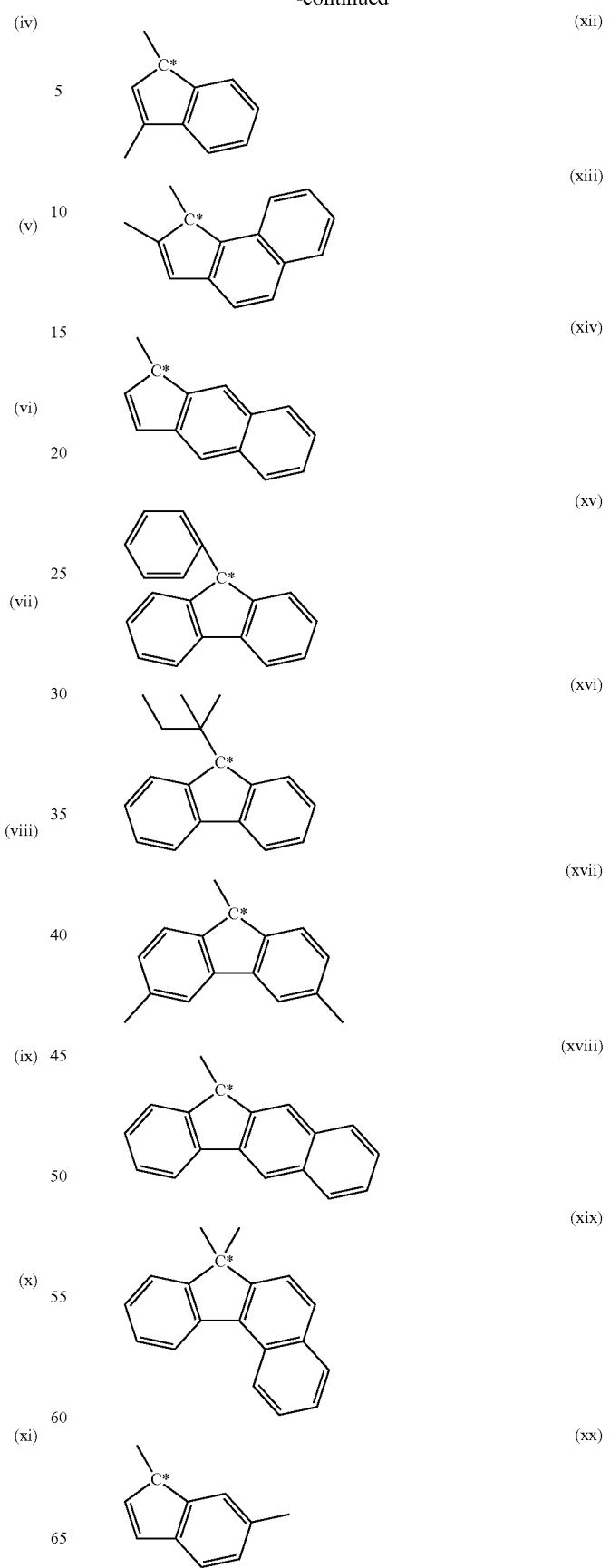

(xxi)

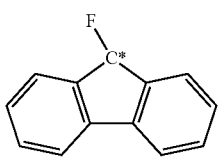

(xxii)

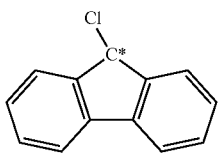

(xxiii)

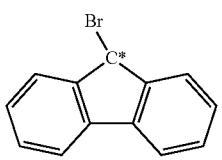

(xxiv)

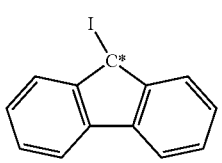

wherein C* is the attachment carbon of the radical and each of the possible substituents of the formulae are independently, hydrogen, a $C_1$-$C_{40}$ hydrocarbyl radical, a functional group comprising elements from Group 13 to 17 of the periodic table of the elements, or a combination thereof. In an embodiment according to the invention, each of $R^{*1}$ and $R^{*2}$ independently comprises identical radicals.

In an embodiment of the invention, $R^1$ and $R^{12}$ in any one of the above catalyst compounds where present are independently selected from the group consisting of methyl and a terminally halo-substituted $C_1$-$C_4$ alkane radical, e.g., trifluoromethyl or 2,2,2-trifluoroethyl. For example, in an embodiment of the invention wherein $R^1$ is methyl and $R^{12}$ is 2,2,2-trifluoroethyl the catalyst compound is represented by the formula:

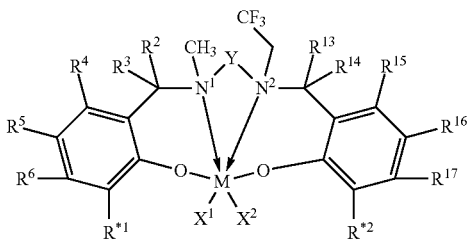

wherein M, $N^1$, $N^2$, $X^1$, $X^2$, O, the $R^2$ through $R^6$, $R^{13}$ through $R^{17}$, $R^{*1}$ and $R^{*2}$ are defined as above.

In another embodiment of the invention, the catalyst compound is represented by the formula:

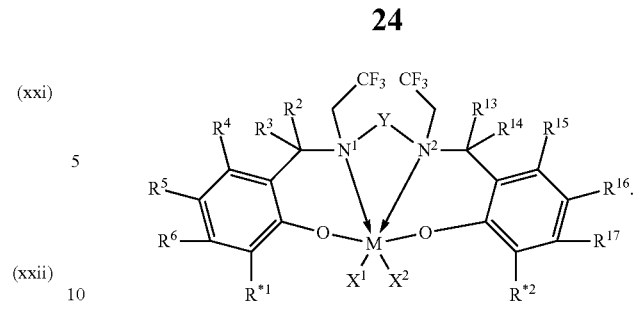

wherein both $R^1$ and $R^{12}$ are 2,2,2-trifluoroethyl, and wherein M, $N^1$, $N^2$, $X^1$, $X^2$, O, $R^2$ through $R^6$, $R^{13}$ through $R^{17}$, $R^{*1}$ and $R^{*2}$ are defined as above.

Methods to Prepare the Catalyst Compounds

In an embodiment according to the invention, symmetric transition metal compounds may be prepared by two general synthetic routes.

Reaction A:

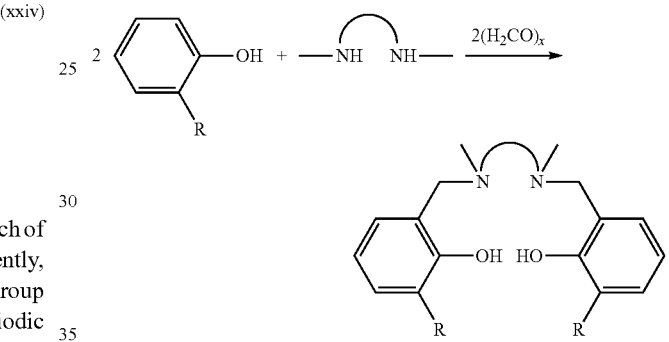

Reaction B:

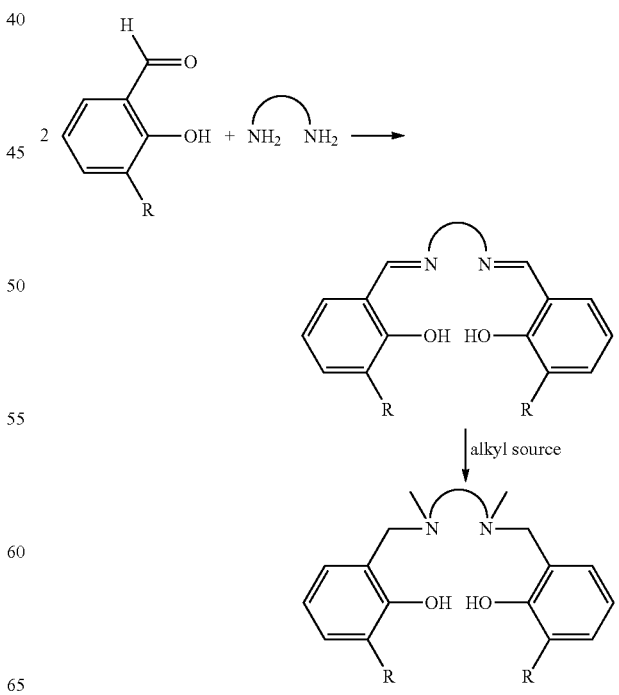

Reaction C:

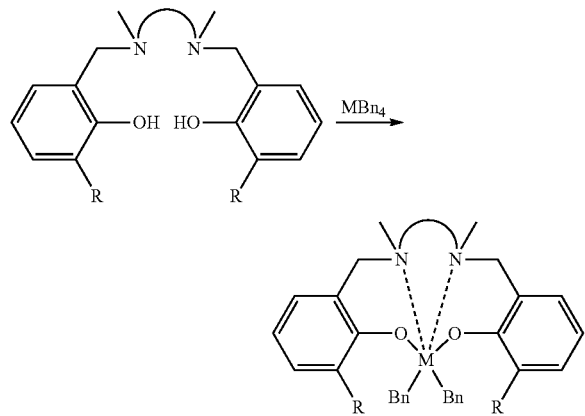

The parent Salan ligands may be prepared by a one-step Mannich reaction from the parent phenol (Reaction A) or by a two-step imine-condensation alkylation procedure if the corresponding salicylaldehyde is used (Reaction B). The ligand is then converted into the metal dibenzyl catalyst precursor by reaction with the metal tetra-aryl starting material, e.g., tetrabenzyl, to yield the finished complex (Reaction C).

In an embodiment according to the invention, asymmetric transition metal compounds may be prepared by a step-wise synthetic route. The parent Salan ligands may be prepared by reaction of the corresponding salicylaldehyde with a diamine, followed by reduction with NaBH$_4$. The asymmetric ligand may then be formed by an HBr elimination reaction with a bromo-alkyl-substituted phenol (Reaction D). The ligand may then be converted into the metal dialkyl (e.g., metal dibenzyl catalyst precursor by reaction with the metal tetrabenzyl starting material to yield the finished complex (Reaction E).

Reaction D:

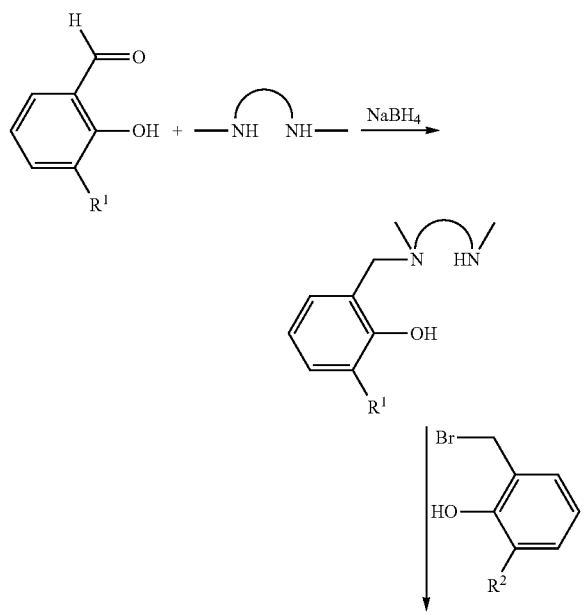

Reaction E:

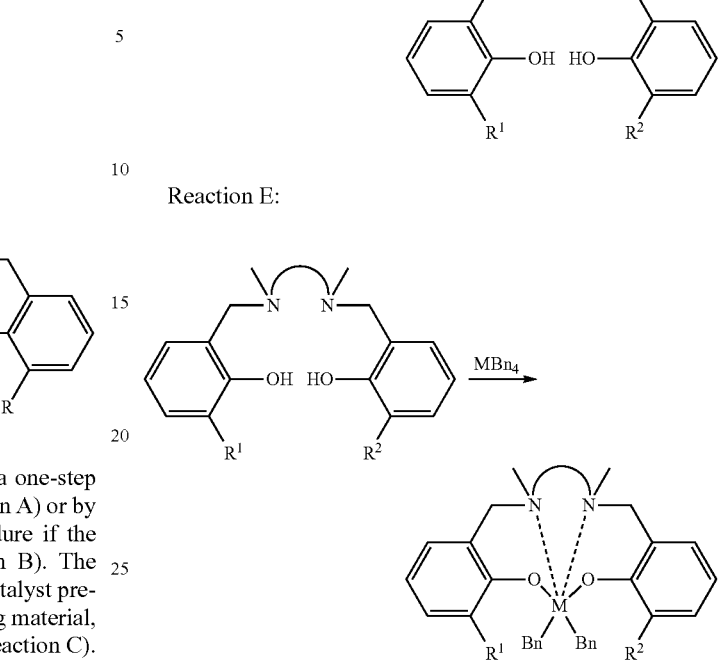

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide or amide. Mixtures of different alumoxanes and modified alumoxanes may also be used. In an embodiment according to the invention, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 or commercially available from Akzo Chemicals, Inc. under the trade designation Modified Methylalumoxane type 3 Å. Solid alumoxanes may also be used.

In an embodiment according to the invention, the activator is a TMA-depleted activator (where TMA is the abbreviation for trimethylaluminum). The inventors have advantageously found that using a TMA-depleted alkyl alumoxane contributes to producing a polymer with higher allyl chain ends. Commercial alumoxanes, such as methylalumoxane (MAO) and isobutylalumoxane, often tend to comprise some residual starting material as an impurity. For example, one common method of making MAO is the hydrolysis of trimethylaluminum (TMA). Such hydrolysis, however, tends to leave residual TMA in the MAO which may have negative effects on polymerization. Any methods known in the art to remove TMA may be used. In an embodiment according to the invention, for example, to produce a TMA-depleted activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid. In an embodiment according to the invention, the TMA-depleted activator comprises from about 1 wt % to about 14 wt % trimethylaluminum, or less than 13 wt % trimethylaluminum, or less than 12 wt % trimethylaluminum, or less than 10 wt % trimethylaluminum, or less than 5 wt % trimethylaluminum, or 0 wt % trimethylaluminum, and/or, greater than 0 wt % trimethylaluminum, or greater than 1 wt % trimethylaluminum.

When the activator is an alumoxane (modified or unmodified), in an embodiment according to the invention, the maximum amount of activator is typically about 5000-fold molar excess Al/M over the catalyst compound (per metal catalytic site). In an embodiment according to the invention, the minimum activator-to-catalyst-compound determined according to molar concentration of the transition metal M is typically about 1 mole aluminum or less to mole of transition metal M. In an embodiment according to the invention, the activator comprises alumoxane and the alumoxane is present at a ratio of 1 mole aluminum or more to mole of catalyst compound. In an embodiment according to the invention, the minimum activator-to-catalyst-compound molar ratio is typically a 1:1 molar ratio. Other examples of Al:M ranges include from 1:1 to 500:1, or from 1:1 to 200:1, or from 1:1 to 100:1, or from 1:1 to 50:1.

In an embodiment according to the invention, little or no alumoxane (i.e., less than 0.001 wt %) is used in the polymerization processes described herein. In an embodiment according to the invention, alumoxane is present at 0.00 mole %, or the alumoxane is present at a molar ratio of aluminum to catalyst compound transition metal less than 500:1, or less than 300:1, or less than 100:1, or less than 1:1.

Scavengers or Co-Activators

In an embodiment according to the invention, the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used. In an embodiment according to the invention, the scavengers and/or co-activators are present at less than 14 wt %, or from 0.1 to 10 wt %, or from 0.5 to 7 wt %, by weight of the catalyst system.

Supports

In an embodiment according to the invention, the catalyst system may comprise an inert support material. In an embodiment according to the invention, the support material comprises a porous support material, for example, talc, and/or inorganic oxides. Other suitable support materials include zeolites, clays, organoclays, or any other organic or inorganic support material and the like, or mixtures thereof.

In an embodiment according to the invention, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, and/or alumina include magnesia, titania, zirconia, montmorillonite, phyllosilicate, and/or the like, as well as combinations of these support materials including silica-chromium, silica-alumina, silica-titania, and the like. In an embodiment according to the invention, the support materials include $Al_2O_3$, $ZrO_2$, $SiO_2$, $SiO_2/Al_2O_3$, and combinations thereof. Other suitable support materials include finely divided functionalized polyolefins, such as finely divided polyethylene.

In an embodiment according to the invention, the support material may have a surface area in the range of from about 10 to about 700 $m^2/g$, pore volume in the range of from about 0.1 to about 4.0 cc/g and average particle size in the range of from about 5 to about 500 μm, or the surface area of the support material is in the range of from about 50 to about 500 $m^2/g$, pore volume of from about 0.5 to about 3.5 cc/g and average particle size of from about 10 to about 200 μm. In an embodiment according to the invention, a majority portion of the surface area of the support material is in the range is from about 100 to about 400 $m^2/g$, pore volume from about 0.8 to about 3.0 cc/g and average particle size is from about 5 to about 100 μm. In an embodiment according to the invention, the average pore size of the support material is in the range of from 10 to 1000 Å, or 50 to about 500 Å, or 75 to about 350 Å. In an embodiment according to the invention, the support material is a high surface area, amorphous silica having a surface area greater than or equal to about 300 $m^2/g$, and/or a pore volume greater than or equal to about 1.65 $cm^3/gm$. Suitable silicas are marketed under the trade names of Davison 952 or Davison 955 by the Davison Chemical Division of W.R. Grace and Company. In an embodiment according to the invention, the support may comprise Davison 948.

In an embodiment according to the invention, the support material should be essentially dry, that is, essentially free of absorbed water. Drying of the support material can be effected by heating or calcining at about 100° C. to about 1000° C., or at a temperature of at least about 400° C., or 500° C., or 600° C. When the support material is silica, it is heated to at least 200° C., or about 200° C. to about 850° C., or at least 600° C. for a time of about 1 minute to about 100 hours, or from about 12 hours to about 72 hours, or from about 24 hours to about 60 hours. In an embodiment according to the invention, the calcined support material must have at least some reactive hydroxyl (OH) groups to produce supported catalyst systems according to the instant disclosure.

In an embodiment according to the invention, the calcined support material is contacted with at least one polymerization catalyst comprising at least one catalyst compound and an activator. In an embodiment according to the invention, the support material, having reactive surface groups, typically hydroxyl groups, is slurried in a non-polar solvent and the resulting slurry is contacted with a solution of a catalyst compound and an activator. In an embodiment according to the invention, the slurry of the support material is first contacted with the activator for a period of time in the range of from about 0.5 hours to about 24 hours, or from about 2 hours to about 16 hours, or from about 4 hours to about 8 hours. The solution of the catalyst compound is then contacted with the isolated support/activator. In an embodiment according to the invention, the supported catalyst system is generated in situ. In alternate embodiment, the slurry of the support material is first contacted with the catalyst compound for a period of time in the range of from about 0.5 hours to about 24 hours, or from about 2 hours to about 16 hours, or from about 4 hours to about 8 hours. The slurry of the supported catalyst compound is then contacted with the activator solution.

In an embodiment according to the invention, the mixture of the catalyst, activator and support is heated to about 0° C. to about 70° C., or to about 23° C. to about 60° C., or to room temperature. Contact times typically range from about 0.5 hours to about 24 hours, or from about 2 hours to about 16 hours, or from about 4 hours to about 8 hours.

Suitable non-polar solvents are materials in which all of the reactants used herein, i.e., the activator and the catalyst compound are at least partially soluble and which are liquid at reaction temperatures. Suitable non-polar solvents include alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In an embodiment according to the invention, the activator, the catalyst compound, or a combination thereof is supported by contacting the activator, the catalyst compound, or both with a support to form a supported activator, supported catalyst, or a combination thereof, wherein the activator, the catalyst compound, or a combination thereof are deposited on, vaporized with, bonded to, incorporated within, adsorbed or absorbed in, or on the support.

In an embodiment according to the invention, the catalyst compounds, activators and/or catalyst systems disclosed herein may be combined with one or more support materials or carriers. For example, in an embodiment according to the invention, the activator is contacted with a support to form a supported activator wherein the activator is deposited on, contacted with, vaporized with, bonded to, or incorporated within, adsorbed or absorbed in, or on, a support or carrier.

In an embodiment according to the invention, the catalyst, the activator, or a combination thereof may be supported using "incipient wetness", wherein a solution comprising the activator, the catalyst compound, or a combination thereof is contacted with the support wherein the amount of the solution is about 95 to about 100 percent of the absorptive capacity of the support material.

In an embodiment according to the invention, the support material is chemically treated and/or dehydrated prior to combining with the catalyst compound, activator and/or catalyst system. In an embodiment according to the invention, the support material may have various levels of dehydration, such as may be achieved by drying the support material at temperatures in the range from about 200° C. to about 1000° C. These supports may also be chemically dehydrated using water reactive compounds such as silane and organoaluminum compounds.

In an embodiment according to the invention, dehydrated silica may be contacted with an organoaluminum or alumoxane compound. In an embodiment according to the invention, wherein an organoaluminum compound is used, the activator is formed in situ in the support material as a result of the reaction of, for example, trimethylaluminum and water.

In an embodiment according to the invention, Lewis base-containing support substrates will react with a Lewis acidic activator to form a support bonded Lewis acid compound. The Lewis base hydroxyl groups of silica are exemplary of metal/metalloid oxides where this method of bonding to a support occurs. These embodiments are described in, for example, U.S. Pat. No. 6,147,173.

Other embodiments of supporting an activator are described in U.S. Pat. No. 5,427,991, where supported non-coordinating anions derived from trisperfluorophenyl boron are described; U.S. Pat. No. 5,643,847, discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions.

In an embodiment according to the invention, the supported activator is formed by preparing, in an agitated, temperature and pressure controlled vessel, a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 34.5 kPa to 138 kPa (5 psia to 20 psia). An inert gas sweep can also be used in assist in removing solvent. Alternate orders of addition, such as slurrying the support material in an appropriate solvent then adding the activator, can be used.

In an embodiment according to the invention, the weight percent of the activator to the support material is in the range from about 10 weight percent to about 70 weight percent, in the range from about 20 weight percent to about 60 weight percent in other embodiments, in the range from about 30 weight percent to about 50 weight percent in other embodiments, and in the range from about 30 weight percent to about 40 weight percent in yet other embodiments.

Supported catalysts system useful in embodiments disclosed herein include those supported catalyst systems that are formed by contacting a support material, an activator and a catalyst compound in various ways under a variety of conditions outside of a catalyst feeder apparatus.

In an embodiment according to the invention, a catalyst compound, activator and support, may be fed into the polymerization reactor as a mineral oil slurry or as a slurry in liquid diluent. Solids concentrations in the mineral oil or liquid diluent may range from about 3 to about 30 weight percent in some embodiments; and from about 10 to about 25 weight percent in other embodiments.

In an embodiment according to the invention, the catalyst compound(s), activator(s) and/or support(s) used herein may also be spray dried separately or together prior to being injected into the reactor. The spray dried catalyst may be used as a powder or solid or may be placed in a diluent and slurried into the reactor. In an embodiment according to the invention, a support is combined with one or more activators and is spray dried to form a supported activator. In an embodiment according to the invention, fumed silica is combined with methyl alumoxane and then spray dried to from supported methyl alumoxane, a support may be combined with alumoxane, spray dried and then placed in mineral oil to form a slurry useful according to the instant disclosure. In an embodiment according to the invention, the catalyst compounds described above may be combined with one or more support material(s) and/or one or more activator(s) and spray dried prior to being combined with a slurry diluent.

In an embodiment according to the invention, the catalyst compounds and/or the activators are combined with a support material such as a particulate filler material and then spray dried, which may form a free flowing powder. Spray drying may be by any means known in the art. In an embodiment according to the invention, the catalyst may be spray dried by placing the catalyst compound and the activator in solution, allowing the catalyst compound and activator to react, if desired, adding a filler material such as silica and/or fumed silica, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Slurry concentrations may be about 5 to 8 wt %. This formulation may sit as a slurry for as long as 30 minutes with mild stirring or manual shaking to keep it as a suspension before spray-drying. In an embodiment according to the invention, the makeup of the dried material is about 40-50 wt % activator (e.g., alumoxane), 50-60 $SiO_2$ and about 2 wt % catalyst compound.

In an embodiment according to the invention, two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 vol % can be present in the activator/filler mixture prior to the addition of the first catalyst compound.

In an embodiment according to the invention, binders are added to the mix. These can be added as a means of improving the particle morphology, i.e. narrowing the particle size distribution, lower porosity of the particles and allowing for a reduced quantity of alumoxane, which is acting as the "binder".

In an embodiment according to the invention, spray dried particles are fed into the polymerization reactor as a mineral oil slurry. Solids concentrations in oil are about 10 to 30 wt %, or 15 to 25 wt %. In an embodiment according to the invention, the spray dried particles can be from less than about 10 micrometers in size up to about 100 micrometers, compared to conventional supported catalysts which are about 50 micrometers. In an embodiment according to the invention, the support has an average particle size of 1 to 50 microns, or 10 to 40 microns.

In an embodiment according to the invention, a catalyst composition according to the instant disclosure is utilized in a catalyst component slurry and/or in a catalyst component solution. For the purposes of the instant disclosure, a slurry is defined to be a suspension of a solid, where the solid may or may not be porous, in a liquid. The catalyst component slurry and the catalyst component solution are combined to form the catalyst composition which is then introduced into a polymerization reactor. In an embodiment according to the invention, the catalyst component slurry includes an activator and a support, or a supported activator. In an embodiment according to the invention, the slurry also includes a catalyst compound in addition to the activator and the support and/or the supported activator. In an embodiment according to the invention, the catalyst compound in the slurry is supported. In an embodiment according to the invention, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compounds. In an embodiment according to the invention, the slurry comprises a supported activator and two catalyst compounds.

In an embodiment according to the invention, the slurry comprises supported activator and two different catalyst compounds, which may be added to the slurry separately or in combination. In an embodiment according to the invention, the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react. In an embodiment according to the invention, the molar ratio of metal in the activator to metal in the catalyst compound in the slurry is 1000:1 to 0.5:1, or 300:1 to 1:1, or 150:1 to 1:1.

Polymerization Processes

In an embodiment according to the invention, a polymerization process includes contacting monomers (such as ethylene and propylene), and optionally comonomers, with a catalyst system comprising an activator and at least one catalyst compound, as described above at a temperature, a pressure, and for a period of time sufficient to produce a polyolefin. In an embodiment according to the invention, the catalyst compound and activator may be combined in any order, and may be combined prior to contacting with the monomer. In an embodiment according to the invention, the catalyst compound and/or the activator are combined after contacting with the monomer.

In an embodiment according to the invention, two or more different catalyst compounds are present in the catalyst system used herein. In an embodiment according to the invention, two or more different catalyst compounds are present in the reaction zone where the process or processes described herein occur. When two transition metal compound based catalysts are used in one reactor as a mixed catalyst system, the two transition metal compounds are chosen such that the two are compatible. Compatible catalysts are those catalysts having similar kinetics of termination and insertion of monomer and comonomer(s) and/or do not detrimentally interact with each other. For purposes herein, the term "incompatible catalysts" refers to and means catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%. A simple screening method such as by $^1H$ or $^{13}C$ NMR, known to those of ordinary skill in the art, can be used to determine which transition metal compounds are compatible. In an embodiment according to the invention, the catalyst systems use the same activator for the catalyst compounds. In an embodiment according to the invention, two or more different activators, such as a non-coordinating anion activator and an alumoxane, can be used in combination. If one or more catalyst compounds contain an $X^1$ or $X^2$ ligand which is not a hydride, or a hydrocarbyl, then in an embodiment according to the invention, the alumoxane is contacted with the catalyst compounds prior to addition of the non-coordinating anion activator.

In an embodiment according to the invention, when two transition metal compounds (pre-catalysts) are utilized, they may be used in any ratio. In an embodiment according to the invention, a molar ratio of a first transition metal compound (A) to a second transition metal compound (B) will fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact pre-catalysts chosen, the method of activation, and the end product desired. In an embodiment according to the invention, when using two pre-catalysts, where both are activated with the same activator, a useful mole percent, based upon the total moles of the pre-catalysts, are 10:90 to 0.1:99, or 25:75 to 99:1, or 50:50 to 99.5:0.5, or 50:50 to 99:1, or 75:25 to 99:1, or 90:10 to 99:1.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment according to the invention, the monomer comprises propylene and an optional comonomer(s) comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment according to the invention, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment according to the invention, one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment according to the invention, 500 ppm or less of diene is added to the polymerization, or 400 ppm or less, or 300 ppm or less. In an embodiment according to the invention, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment according to the invention, the diolefin monomers may be selected from alpha, omega-diene monomers (i.e. di-vinyl monomers). Preferably, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment according to the invention, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein; wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 volume % or more. In an embodiment according to the invention, no solvent or diluent is present or added in the reaction medium, (except for the small amounts used as the carrier for the catalyst system or other additives, or amounts typically found with the monomer; e.g., propane in propylene). In an embodiment according to the invention, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment according to the invention, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment according to the invention, the solvent is not aromatic, or aromatics are present in the solvent at less than 1 wt %, or less than 0.5 wt %, or less than 0.0 wt % based upon the weight of the solvents.

In an embodiment according to the invention, the feed concentration of the monomers and comonomers for the polymerization is 60 vol % solvent or less, or 40 vol % or less, or 20 vol % or less, based on the total volume of the feedstream. The polymerization may also be run in a bulk process.

Polymerizations can be run at any temperature and/or pressure suitable to obtain the desired ethylene polymers. Suitable temperatures and/or pressures include a temperature in the range of from about 0° C. to about 300° C., or from about 20° C. to about 200° C., or from about 35° C. to about 150° C., or from about 50° C. to about 150° C., or from about 40° C. to about 120° C., or from about 45° C. to about 80° C.; and a pressure in the range of from about 0.35 MPa to about 10 MPa, or from about 0.45 MPa to about 6 MPa, or from about 0.5 MPa to about 4 MPa.

In an embodiment according to the invention, the run time of the reaction is from about 0.1 minutes to about 24 hours, or up to 16 hours, or in the range of from about 5 to 250 minutes, or from about 10 to 120 minutes.

In an embodiment according to the invention, hydrogen is present in the polymerization reactor at a partial pressure of 0.007 kPa to 345 kPa (0.001 to 50 psig), or from 0.07 kPa to 172 kPa (0.01 to 25 psig), or 0.7 kPa to 70 kPa (0.1 to 10 psig).

In an embodiment according to the invention, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment according to the invention, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; or equal to or less than about 8:1) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment according to the invention, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment according to the invention, the polymerization occurs in one reaction zone.

Polyolefin Products

The instant disclosure also relates to compositions of matter produced by the methods described herein.

In an embodiment according to the invention, the process described herein produces propylene homopolymers or propylene copolymers, such as propylene-ethylene and/or propylene-α-olefin (or $C_3$ to $C_{20}$) copolymers (such as propylene-hexene copolymers or propylene-octene copolymers) having a Mw/Mn of greater than 1 to 4 (or greater than 1 to 3).

Likewise, the process of this invention produces olefin polymers, or polyethylene and polypropylene homopolymers and copolymers. In an embodiment according to the invention, the polymers produced herein are homopolymers of ethylene or propylene, are copolymers of ethylene or having from 0 to 25 mole % (or from 0.5 to 20 mole %, or from 1 to 15 mole %, or from 3 to 10 mole %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mole % (or from 0.5 to 20 mole %, or from 1 to 15 mole %, or from 3 to 10 mole %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment according to the invention, the monomer is ethylene and the comonomer is hexene, or from 1 to 15 mole % hexene, or 1 to 10 mole % hexene.

In an embodiment according to the invention, the polymers produced herein have an Mw of at least 500,000 g/mol, or at least 800,000 g/mol, or at least 1,000,000 g/mol, or at least 1,200,000 g/mol, or at least 1,500,000 g/mol, and/or an Mw/Mn of greater than 1 to 40, or 1.2 to 20, or 1.3 to 10, or 1.4 to 5, or 1.5 to 4, or 1.5 to 3.

In an embodiment according to the invention, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In an embodiment according to the invention, the polyolefins produced using the instant catalyst may be isotactic, highly isotactic, syndiotactic, or highly syndiotactic propylene polymer. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, the polyolefin (preferably polypropylene) has at least 85% isotacticity, or at least 90% isotacticity, or at least 95% isotacticity. As used herein, "syndiotactic" is defined as having at least 10% syndiotactic pentads, preferably at least 40%, according to analysis by $^{13}$C-NMR.

In an embodiment according to the invention, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO93/03093 (U.S. Pat. No. 5,206,075). In an embodiment according to the invention, the polymer produced herein has a composition distribution breadth index (CDBI) of 50% or more, or 60% or more, or 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Polymers with an Mw/Mn of 4.5 or less may include a significant level of long chain branching. The long chain branching is understood to be the result of the incorporation of terminally unsaturated polymer chains (formed by the specific termination reaction mechanism encountered with single site catalysts) into other polymer chains in a manner analogous to monomer incorporation. The branches are hence believed to be linear in structure and may be present at a level where no peaks can be specifically attributed to such long chain branches in the $^{13}$C NMR spectrum. In an embodiment according to the invention, the polymers produced according to the instant disclosure comprise a significant amount of long chain branching, defined as having a ratio of long chain branching of at least 7 carbons per 1000 carbon atoms as determined according to the $^{13}$C NMR spectrum of greater than 0.5. In an embodiment according to the invention, the ratio of long chain branching with branches having at least 7 carbons, per 1000 carbon atoms as determined according to the $^{13}$C NMR spectrum is greater than 1, or greater than 1.5, or greater than 2.

In an embodiment according to the invention, the polymers produced according to the instant disclosure include a significant amount of vinyl termination, defined as a ratio of vinyl groups per molecule of greater than or equal to 0.2. In an embodiment according to the invention, the polymers according to the instant disclosure comprise a ratio of vinyl groups per molecule of greater than or equal to 0.5, or 0.7, or 0.8, or 0.9, or 0.95, when determined according to the description provided in the *J. American Chemical Soc.*, 114, 1992, pp. 1025-1032, or an equivalent thereof.

In an embodiment according to the invention, propylene polymer produced using the instant catalyst comprise at least 50% vinyl or unsaturated chain ends. In an embodiment of the invention, at least 90%, or at least 95%, or at least 99% vinylidene chain ends.

This invention relates to ethylene polymers having both vinyl termination and long chain branching, which in an embodiment according to the invention, are produced by the processes and using the catalyst disclosed herein. In an embodiment according to the invention, the process described herein produces ethylene homopolymers or ethylene copolymers, such as ethylene-alpha-olefin, or $C_3$ to $C_{20}$ copolymers such as ethylene-propylene copolymers, ethylene-hexene copolymers or ethylene-octene copolymers having:

a) at least 50% allyl chain ends, or least 60%, 70%, 80%, 90%, 95%, 98%, or 99%; and/or b) an Mn of at least 200 g/mol, measured by $^1$H NMR, or 250 g/mol to 100,000 g/mol, e.g., or 200 g/mol to 75,000 g/mol, e.g., or 200 g/mol to 60,000 g/mol, or 300 g/mol to 60,000 g/mol, or 750 g/mol to 30,000 g/mol); and/or c) at least 0.5 branches having 7 or more carbon atoms per 1000 carbon atoms, or 1.0 or more, or 1.25 or more, or 1.5 or more, or 1.75 or more, or 2.0 or more, or from 0.5 to 5.0, or from 1.0 to 4.0, or from 1.5 to 3.0; and/or d) a Tm of 100° C. or more, or 110° C. or more, or 120° C. or more; and/or e) a ratio of methyl chain ends, also referred to herein as saturated chain ends, to allyl chain ends of 1:1 to 5:1, or 1:1 to 4:1, or 1:1 to 3:1; and/or f) at least 50 wt % of the polymer, which may be an ethylene homopolymer or copolymer, has one vinyl per molecule or per chain as determined by $^1$H NMR, or at least 60 wt %, or at least 70 wt %, or at least 80 wt %, or at least 90 wt %, or at least 95 wt %; and/or essentially no diene is present, or the polymer comprises less than or equal to about 0.01 wt % diene; and/or g) the polymer comprises at least 50 mol % ethylene, or at least 60 mol %, or at least 70 mol %, or at least 75 mol %, or at least 80 mol %, or at least 85 mol %, or at least 90 mol %, or at least 95 mol %, or essentially 100 mol % ethylene; and/or h) an Mw/Mn of greater than 1 to 4, or greater than 1 to 3.

In an embodiment according to the invention, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment according to the invention, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment according to the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment according to the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment according to the invention, the polymer produced herein, which may be an ethylene polymer, has a density of greater than 0.95 g/cc, or greater than 0.955 g/cc, or greater than 0.96 g/cc.

In an embodiment according to the invention, the ethylene polymer produced herein has a branching index (g'vis) of 0.9 or less, or 0.85 or less, or 0.80 or less, where g'vis is determined as described below.

For purposes of this invention and the claims thereto, Mw, Mz, number of carbon atoms, g value and g'$_{vis}$ are determined by Gel Permeation Chromatograph (GPC) using a High Temperature Size Exclusion Chromatograph (either from Waters Corporation or Polymer Laboratories), equipped with a differential refractive index detector (DRI), or three in-line detectors, a differential refractive index detector (DRI), a light scattering (LS) detector, and a viscometer, depending on the analyte and the required analysis. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns, or an equivalent thereof are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 14 5° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN or an equivalent thereof. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, or an equivalent thereof having four capillaries arranged in a Wheatstone bridge configuration with two pressure transducers is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

"g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls}=K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_T M^{\alpha_s}$. $\alpha_s$ is the size coefficient for the polymacromer, $K_T$ is the power law coefficient for the polymacromer. See Macromolecules, 2001, 34, 6812-6820, for guidance on selecting a linear standards having the molecular weight and comonomer content, and determining K coefficients and a exponents.

For purposes of this invention and the claims thereto, Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol.

Crystallization temperature ($T_c$), melting temperature (or melting point, $T_m$), glass transition temperature ($T_g$) and heat of fusion ($H_f$) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, no the second melt. The Hm sample must have been aged at least 48 hours at room temperature and should not be heated to destroy thermal history.

Ethylene content in ethylene copolymers is determined by ASTM D 5017-96, or an equivalent thereof, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Blends

In an embodiment according to the invention, the polymer (or the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene and/or butene and/or hexene, polybutene, ethylene vinyl acetate copolymer, LDPE, LLDPE, HDPE, ethylene methyl acrylate copolymer, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, ethylene-vinyl alcohol copolymers (EVOH), polymers of aromatic monomers such as polystyrene, poly-1 esters, polyacetal, polyvinylidine fluoride, polyethylene glycols, and/or polyisobutylene.

In an embodiment according to the invention, the polymer (or the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In an embodiment according to the invention, any of the foregoing polymers, such as the foregoing polypropylenes or blends thereof, may be used in a variety of end-use applications. Applications include, for example, mono- or multilayer blown, extruded, and/or shrink films. These films may be formed by any number of well-known extrusion or coextrusion techniques, such as a blown bubble film processing technique, wherein the composition can be extruded in a molten state through an annular die and then expanded to form a uniaxial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the machine direction (MD) at a ratio of up to 15, or between 5 and 7, and in the transverse direction (TD) at a ratio of up to 15, or 7 to 9. However, In an embodiment according to the invention, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In an embodiment according to the invention, one or more layers may be modified by corona treatment, electron beam irradiation, gamma irradiation, flame treatment, or microwave. In an embodiment according to the invention, one or both of the surface layers is modified by corona treatment.

Molded Products

The compositions described herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley$^2$ Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spinbonding, film aperturing, and staple fiber carding. A continuous filament process may also be used, or a spunbonding process may be used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Embodiments

Accordingly, the instant disclosure relates to the following embodiments:

E1. A catalyst compound represented by the formula:

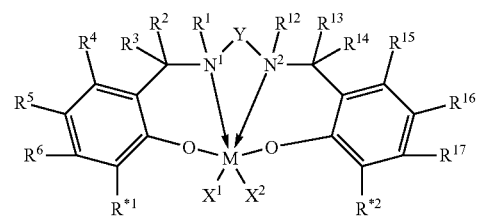

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

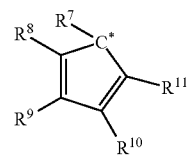

wherein C* indicates an attachment carbon of the radical;

each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;

R[7] is a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

E2. The catalyst compound according to embodiment E1, wherein each of R*[1] and R*[2] independently comprises a substituted or unsubstituted cyclopentadienyl radical, and wherein one of R*[1] and R*[2] independently comprises a substituted or unsubstituted cyclopentadienyl radical represented by the formula:

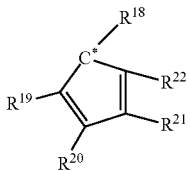

wherein each of R[18], R[19], R[20], R[21], and R[22] is, independently, hydrogen, a $C_1$-$C_{40}$ hydrocarbyl radical, a functional group comprising elements from Groups 13 to 17 of the periodic table of the elements, two or more of R[19], R[20], R[21], and R[22] independently join together to form a $C_4$ to $C_{62}$ cyclic or polycyclic ring structure; or a combination thereof.

E3. The catalyst compound according to embodiment E1, wherein at least one of R*[1] and R*[2] independently comprises a substituted or unsubstituted $C_4$-$C_{20}$ aliphatic or alicyclic radical.

E4. The catalyst compound according to any one of embodiments E1 through E3, wherein at least one of R*[1] and R*[2] independently comprises an electron withdrawing functional group comprising —$NO_2$, —$CF_3$, —$CCl_3$, —$CBr_3$, —$CI_3$, —CN, —$SO_3H$, —COOH, —CHO, —F, —Cl, —Br, —I, —COOR$^\alpha$, —COR$^\alpha$, —NR$^\alpha_3{}^+$, or a combination thereof, wherein each R$^\alpha$ is independently hydrogen or a $C_1$-$C_{20}$ alkyl radical.

E5. The catalyst compound according to any one of embodiments E1 through E4, wherein at least one of R*[1] and R*[2] independently comprises a six membered aromatic ring.

E6. The catalyst compound according to any one of embodiments E1 through E5, wherein at least one of R[8] and R[9], R[10] and R[11], R[19] and R[20] (when present), and R[21] and R[22] (when present), are independently joined together to form at least one six membered aromatic ring.

E7. The catalyst compound according to any one of embodiments E1 through E6, wherein R[8] and R[9] and/or R[10] and R[11] are independently joined together to form an indenyl ring system or a fluorenyl ring system;

wherein R[19] and R[20] (when present), and/or R[21] and R[22] (when present) are independently joined together to form an indenyl ring system or a fluorenyl ring system, or a combination thereof.

E8. The catalyst compound according to any one of embodiments E1 through E7, wherein each of R[7] and R[18] (when present), is independently, a $C_1$-$C_{12}$ aliphatic radical or a phenyl radical.

E9. The catalyst compound according to any one of embodiments E1 through E8, wherein Y is a cyclic, branched or linear divalent $C_1$ to $C_{12}$ alkyl radical.

E10. The catalyst compound according to any one of embodiments E1 through E9, wherein Y is selected from the group consisting of methylene, ethylene, propylene, butylene, pentylene, hexylene, octylene, nonylene, decylene, undecylene, dodecylene, cyclohexylene, phenylene, and benzylene.

E11. The catalyst compound according to any one of embodiments E1 through E10, wherein Y is ethylene (—$CH_2CH_2$—), 1,3-propylene (—CH=$CHCH_2$—), 1,2-cyclohexylene, 1,2-phenylene, or 2-benzylene.

E12. The catalyst compound according to any one of embodiments E1 through E11, wherein M is Hf, Ti, or Zr.

E13. The catalyst compound according to any one of embodiments E1 through E12, wherein each of X[1] and X[2] is, independently, a halogen or a $C_1$ to $C_7$ hydrocarbyl radical.

E14. The catalyst compound according to any one of embodiments E1 through E13, wherein each of X[1] and X[2] is a benzyl radical.

E15. The catalyst compound according to any one of embodiments E1 through E14, wherein each R[1], R[2], R[3], R[4], R[5], R[6], R[8], R[9], R[10], R[11], R[12], R[13], R[14], R[15], R[16], R[17], R[19], R[20], R[21], and R[22] (when present), is independently, hydrogen, a halogen, or a $C_1$ to $C_{30}$ hydrocarbyl radical.

E16. The catalyst compound according to any one of embodiments E1 through E15, wherein each R[1], R[2], R[3], R[4], R[5], R[6], R[8], R[9], R[10], R[11], R[12], R[13], R[14], R[15], R[16], R[17], R[19], R[20], R[21], and R[22] (when present), is independently, hydrogen, a halogen, or a $C_1$ to $C_{10}$ hydrocarbyl radical.

E17. The catalyst compound according to any one of embodiments E1 through E16, wherein R[1] and R[12] are independently selected from the group consisting of methyl and a terminally halo-substituted $C_1$-$C_4$ alkane radical.

E18. The catalyst compound according to any one of embodiments E1 through E17, wherein R[1] and R[12] are independently selected from the group consisting of methyl and a terminally halo-substituted $C_1$-$C_4$ alkane radical, preferably a trihalomethane or a 2,2,2-trihaloethane, more preferably trifluoromethane or 2,2,2-trifluoroethane.

E19. The catalyst compound according to any one of embodiments E1 through E18, wherein R[1] and R[12] are independently selected from the group consisting of methyl, trifluoromethyl and 2,2,2-trifluoroethyl, wherein at least one of R[1] and R[12] is trifluoromethyl or 2,2,2-trifluoroethyl.

E20. The catalyst compound according to any one of embodiments E1 through E19, wherein each of R*[1] and R*[2] are independently selected from the group consisting of substituted or unsubstituted radicals comprising any one of the formulae:

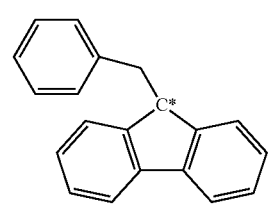

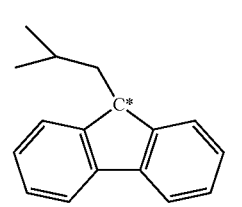

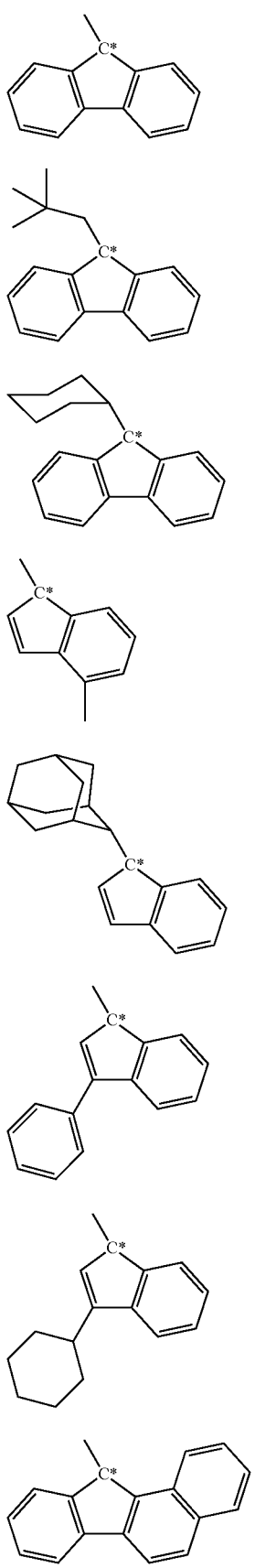
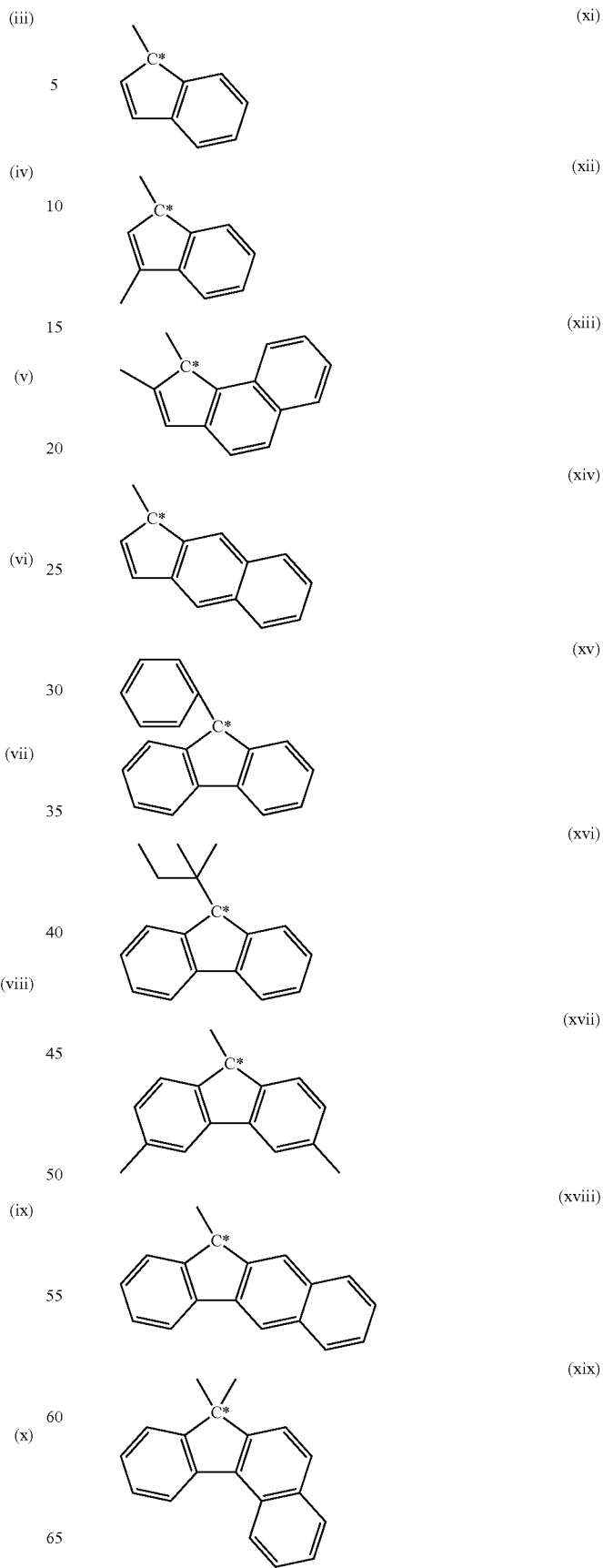

-continued

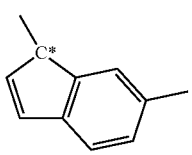
(xx)

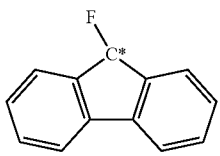
(xxi)

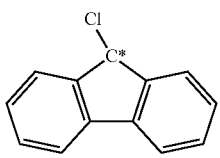
(xxii)

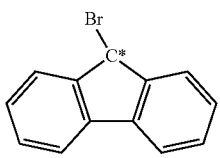
(xxiii)

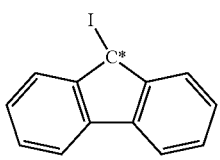
(xxiv)

wherein C* is the attachment carbon of the radical, and wherein each of the substituents of the formulae (i) to (xxiv) are independently, hydrogen, a $C_1$-$C_{40}$ hydrocarbyl radical, a functional group comprising elements from Group 13 to 17 of the periodic table of the elements, an electron withdrawing group, or a combination thereof.

E21. The catalyst compound according to any one of embodiments E1 to E20 wherein each of $R^{*1}$ and $R^{*2}$ are identical.

E22. The catalyst compound according to any one of embodiments E1 through E21, represented by the formula:

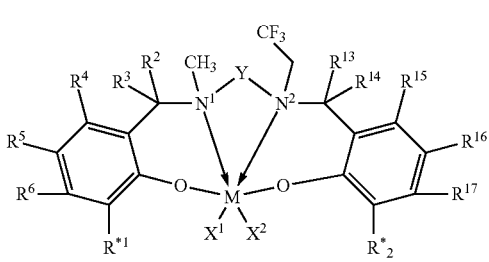

and/or wherein the catalyst compound is represented by the formulae:

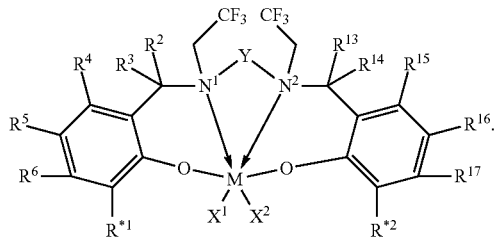

wherein $R^2$ through $R^6$, $R^{13}$ through $R^{17}$, $R^{*1}$ and $R^{*2}$ are defined as above.

E23. The catalyst compound according to embodiment E22, wherein each of $X^1$ and $X^2$ is a $C_1$ to $C_7$ hydrocarbyl radical or a benzyl radical.

E24. The catalyst compound according to any one of embodiments E22 or E23, wherein each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a halogen, or a $C_1$ to $C_{30}$ hydrocarbyl radical.

E25. The catalyst compound according to any one of embodiments E22 through E24 wherein each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a halogen, or a $C_1$ to $C_{10}$ hydrocarbyl radical.

E26. The catalyst compound according to any one of embodiments E22 through E25, wherein at least one of $R^{*1}$ and $R^{*2}$ independently comprises an aromatic or partially aromatic ring system.

E27. The catalyst compound according to any one of embodiments E22 through E26, wherein at least one of $R^{*1}$ and $R^{*2}$ independently comprises at least one six membered aromatic ring.

E28. The catalyst compound according to any one of embodiments E22 through E27, wherein at least one of $R^{*1}$ and $R^{*2}$ independently comprises an indenyl ring system or a fluorenyl ring system.

E29. The catalyst compound according to any one of embodiments E22 through E28, wherein each $R^7$ is a $C_1$-$C_{12}$ aliphatic radical or a phenyl radical, preferably a t-butyl radical or a phenyl radical.

E30. The catalyst compound according to any one of embodiments E1 through E29, represented by the formula:

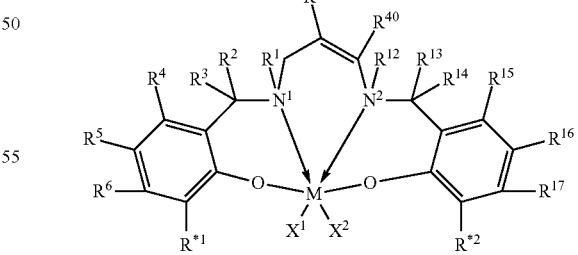

wherein $R^1$ through $R^{17}$, $R^{*1}$ and $R^{*2}$ are defined as above, and wherein each of $R^{39}$ and $R^{40}$ is, independently, hydrogen, a $C_1$-$C_{40}$ hydrocarbyl radical, a functional group comprising elements from Groups 13 to 17 of the periodic table of the elements, $R^{39}$ and $R^{40}$ join together to form a $C_4$ to $C_{62}$ cyclic or polycyclic ring structure, or a combination thereof.

E31. The catalyst compound according to any one of embodiments E1 through E29, represented by the formula:

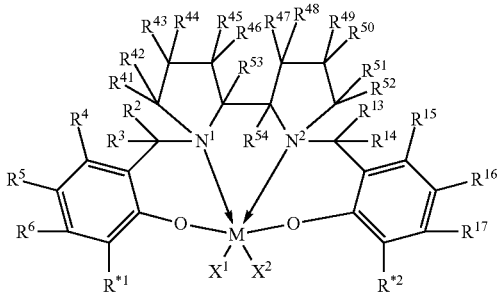

wherein $R^2$ through $R^{11}$, $R^{13}$ through $R^{17}$, $R^{*1}$ and $R^{*2}$ are defined as above, and wherein each of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ is, independently, hydrogen, a $C_1$-$C_{40}$ hydrocarbyl radical, a functional group comprising elements from Groups 13 to 17 of the periodic table of the elements, two or more of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ independently join together to form a $C_4$ to $C_{62}$ cyclic or polycyclic ring structure; or a combination thereof.

E32. A catalyst compound represented by the formula:

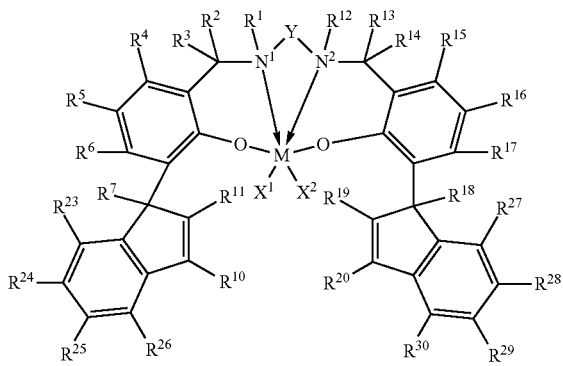

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ independently join together to form a $C_4$ to $C_{62}$ cyclic or polycyclic ring structure, or a combination thereof;

each $R^7$ and $R^{18}$ is, independently, a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

E33. A catalyst compound represented by the formula:

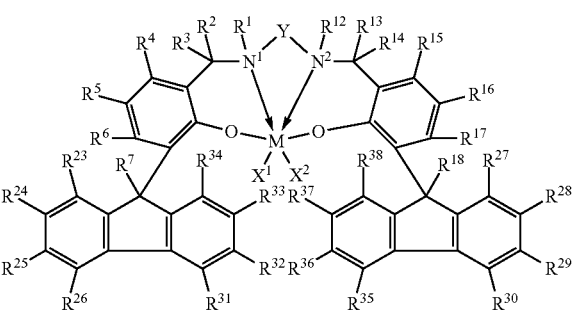

wherein each solid line represents a covalent bond and each arrow represents a bond having a varying degree of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ is independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ independently join together to form a $C_4$ to $C_{62}$ cyclic or polycyclic ring structure, or a combination thereof;

each $R^7$ and $R^{18}$ is, independently, a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

E34. The catalyst compound according to embodiment E33, wherein:

M is Zr or Hf;

$X^1$ and $X^2$ are benzyl radicals;

$R^1$, $R^5$, $R^7$, $R^{12}$, $R^{16}$, and $R^{18}$ are methyl radicals;

$R^2$, $R^3$, $R^4$, $R^6$, $R^{13}$, $R^{14}$, $R^{15}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are hydrogen; and Y is ethylene (—$CH_2CH_2$—).

E35. The catalyst compound according to embodiment E33, represented by one of the formulae:

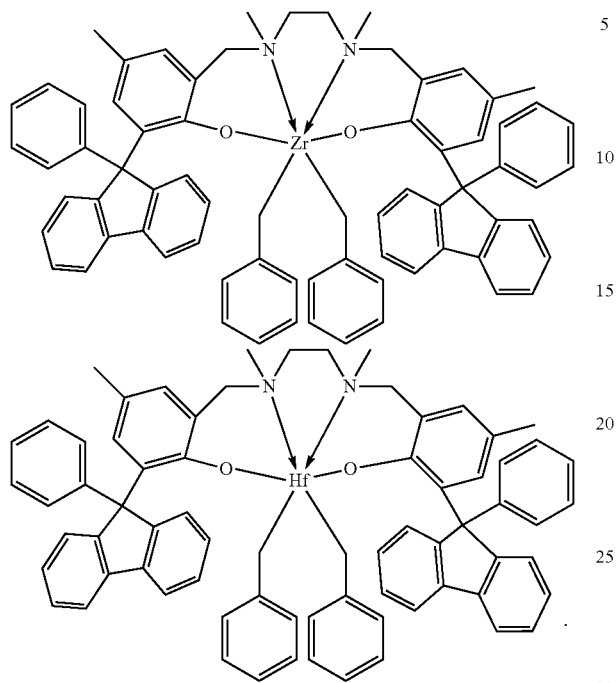

E36. A catalyst system comprising an activator and a catalyst compound according to any one of embodiments E1 through E35.

E37. The catalyst system according to embodiment E36, wherein the catalyst compound, the activator, or both are disposed on or within a support.

E38. The catalyst system according to embodiment E36 or E37, wherein the support comprises an inorganic oxide material comprising Groups 2, 4, 13, or 14 metal oxides.

E39. The catalyst system according to embodiment E37, wherein the support comprises $Al_2O_3$, $ZrO_2$, $SiO_2$, $SiO_2/Al_2O_3$, finely divided functionalized polyolefins, or a combination thereof.

E40. A catalyst system comprising:
an activator and a catalyst compound represented by the formula:

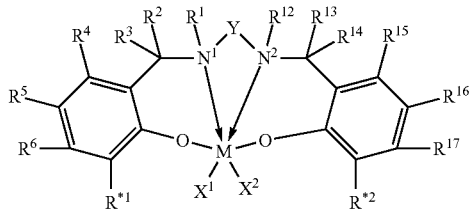

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

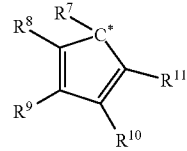

wherein C* indicates an attachment carbon of the radical;
each $R^1, R^2, R^3, R^4, R^5, R^6, R^8, R^9, R^{10}, R^{11}, R^{12}, R^{13}, R^{14}, R^{15}, R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1, R^2, R^3, R^4, R^5, R^6, R^8, R^9, R^{10}, R^{11}, R^{12}, R^{13}, R^{14}, R^{15}, R^{16}$, and $R^{17}$ independently join together to form a $C_4$ to $C_{62}$ cyclic or polycyclic ring structure, or a combination thereof;
$R^7$ is a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

E41. The catalyst system according to embodiment E40, wherein each of $R^{*1}$ and $R^{*2}$ independently comprises a substituted or unsubstituted cyclopentadienyl radical, and wherein one of $R^{*1}$ and $R^{*2}$ independently comprises a substituted or unsubstituted cyclopentadienyl radical represented by the formula:

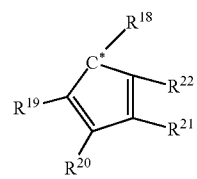

wherein C* indicates an attachment carbon of the radical;
wherein each of $R^{18}, R^{19}, R^{20}, R^{21}$, and $R^{22}$ is, independently, hydrogen, a $C_1$-$C_{40}$ hydrocarbyl radical, a functional group comprising elements from Groups 13 to 17 of the periodic table of the elements, two or more of $R^{19}, R^{20}, R^{21}$, and $R^{22}$ independently join together to form a $C_4$ to $C_{62}$ cyclic or polycyclic ring structure, or a combination thereof.

E42. The catalyst system according to embodiment E40, wherein at least one of $R^{*1}$ and $R^{*2}$ independently comprises a substituted or unsubstituted $C_4$-$C_{20}$ aliphatic or alicyclic radical.

E43. The catalyst system according to embodiment E40, wherein at least one of $R^{*1}$ and $R^{*2}$ independently comprises an electron withdrawing functional group comprising —$NO_2$, —$CF_3$, —$CCl_3$, —$CBr_3$, —$Cl_3$, —CN, —$SO_3H$, —COOH, —CHO, —F, —Cl, —Br, —I, —COOR$^\alpha$, —COR$^\alpha$, —NR$^\alpha_3{}^+$, or a combination thereof, wherein each R$^\alpha$ is independently hydrogen or a $C_1$-$C_{20}$ alkyl radical.

E44. A process comprising contacting one or more olefins with a catalyst system according to any one of embodiments E36 to E43 at a temperature, a pressure, and for a period of time sufficient to produce a polyolefin.

E45. The process according to embodiment E44, wherein the activator comprises an alumoxane, a modified alumoxane, a noncoordinating or weakly coordinating anion, or a combination thereof.

E46. The process according to embodiment E44 or E45, wherein the activator is a trimethylaluminum-depleted activator.

E47. The process according to any one of embodiments E44 through E46, wherein a minimum activator-to-catalyst-compound molar ratio is from about 1:1 to about 500:1.

E48. The process according to any one of embodiments E44 through E47 comprising less than 0.001 wt % alumoxane.

E49. The polyolefin obtained by the process according to any one of embodiments E44 through E48.

E50. The polyolefin according to embodiment E49 comprising an ethylene polymer having an Mw of at least 500,000 g/mol.

E51. The polyolefin according to embodiment E49 comprising a propylene polymer having an isotacticity of at least 90%.

E52. The polyolefin according to any one of embodiments E49 through E51, comprising a propylene polymer having an isotacticity of at least 95%.

E53. The polyolefin according to any one of embodiments E49 through E52 having an Mw of at least 500,000 g/mol, or at least 800,000 g/mol, or at least 1,000,000 g/mol, or at least 1,200,000 g/mol, or at least 1,500,000 g/mol.

E54. The polyolefin according to any one of embodiments E49 through E53 having an Mw/Mn of greater than 1 to 40, or 1.2 to 20, or 1.3 to 10, or 1.4 to 5, or 1.5 to 4, or 1.5 to 3.

E55. The polyolefin according to any one of embodiments E49 through E54, including monomers comprising substituted or unsubstituted $C_2$ to $C_{40}$ alpha olefins, or $C_2$ to $C_{20}$ alpha olefins, or $C_2$ to $C_{12}$ alpha olefins, or ethylene, or propylene, or butene, or pentene, or hexene, or heptene, or octene, or nonene, or decene, or undecene, or dodecane, or a combination thereof.

E56. The polyolefin according to any one of embodiments E49 through E55,
wherein the monomer olefins are strained or unstrained;
wherein the monomer olefins are monocyclic or polycyclic,
wherein the monomer olefins include heteroatoms,
wherein the monomer olefins comprise one or more functional groups, or a combination thereof.

E57. A molded article comprising the polyolefin according to any one of embodiments E49 through E56.

E58. A film comprising the polyolefin according to any one of embodiments E49 through E56.

E59. A nonwoven fabric and/or fiber comprising the polyolefin according to any one of embodiments E49 through E56.

EXAMPLES

The foregoing discussion can be further described with reference to the following non-limiting examples. An illustrative catalyst compound according to one or more embodiments described, was synthesized and used to polymerize olefins. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art. Deuterated solvents were obtained from Cambridge Isotope Laboratories (Andover, Mass.) and dried over 3 Å molecular sieves. All $^1$H NMR data were collected on a Broker AVANCE III 400 MHz spectrometer running Topspin™ 3.0 software at room temperature (~25° C.) using tetrachloroethane-$d_2$ as a solvent (chemical shift of 5.98 ppm was used as a reference) for all materials.

Synthesis of Compound A (CAT A)

Synthesis of 9-methy-9H-fluoren-9-ol (1)

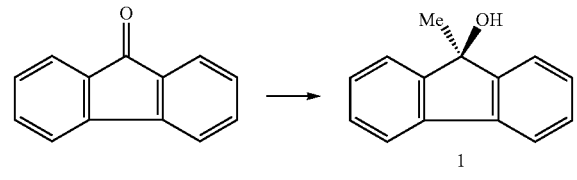

In a glovebox, in a 50 mL round bottom flask, 9H-fluorene-9-one (5.458 g, 30.3 mmol) was dissolved in 20 mL of THF and cooled to 0° C. for 30 minutes. MeMgBr (1.2 eq.) was then slowly added via syringe while stirring. A slurry formed once all of the Grignard was added. The reaction was allowed to stir for 48 hours. The flask was then removed from the glovebox and 4 mL of 2M NaOH were added. The mixture was washed with brine and the organic portion collected and dried over MgSO$_4$, filtered and the volatiles removed under a N$_2$ stream. NMR of the resultant yellow solid showed pure 9-methyl-9H-fluoren-9-ol. Yield is 5.67 g (95 wt %).

Synthesis of 4-methyl-2-(9-methyl-9H-fluoren-9-yl) phenol (2)

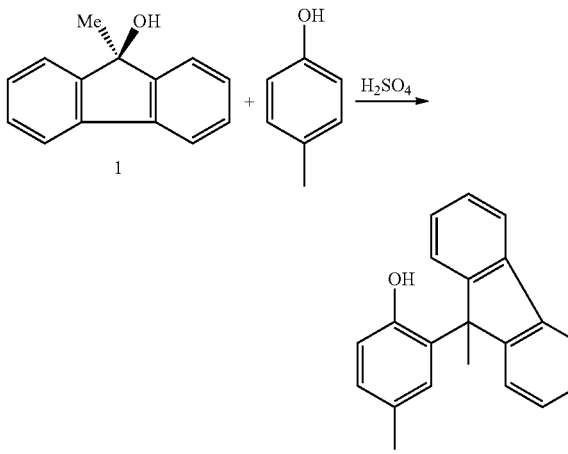

In a 200 mL round bottom flask, p-cresol (2.075 g, 19.2 mmol) and 2 (3.766 g, 19.2 mmol) were dissolved in 80 mL of CH$_2$Cl$_2$. 4 mL of conc. H$_2$SO$_4$ (5 eq.) were added dropwise to the solution while stirring to produce a dark purple solution. After two hours, the purple solution was added slowly to 100 mL of H$_2$O forming a white/blue precipitate. 2M NaOH was then added dropwise until the pH reached 9-10. The slurry was then washed with CH$_2$Cl$_2$ (3×100 mL). The organic portion was then collected and dried with MgSO$_4$. Volatiles were under N$_2$ leaving a brownish residue. The resultant product was purified on a silica column using a 5-10% gradient of EtOAc/Hexane.

Synthesis of 6,6'-(ethane-1,2-diylbis(methyla-zanediyl))bis(methylene)bis)4-methyl-2-(9-methyl-9H-fluoren-9-yl)phenol (3)

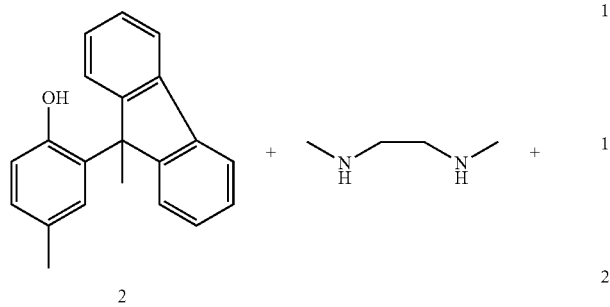

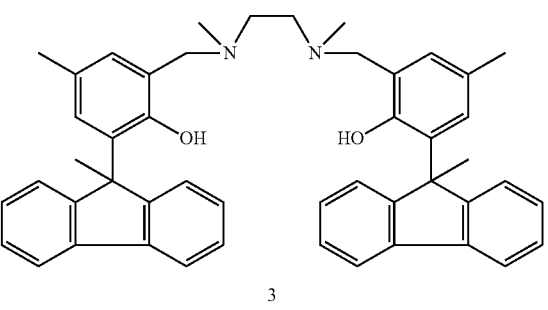

In a 100 mL round bottom flask, 2 (0.512 g, 1.8 mmol), N¹,N²-dimethylethane-1,2-diamine (0.079 g, 0.9 mmol) and formaldehyde (0.268 g, 8.9 mmol) were dissolved in 30 mL of ethanol. The flask was placed in an oil bath and heated to reflux for 16 hours. The ethanol was removed under a $N_2$ stream to give a yellow oil. The product was purified on a silica column using $CH_2Cl_2$/hexane.

Synthesis of [6,6'-(ethane-1,2-diylbis(methyla-zanediyl))bis(methylene)bis)4-methyl-2-(9-methyl-9H-fluoren-9-yl)phenolate]zirconium(IV)dibenzyl (4)

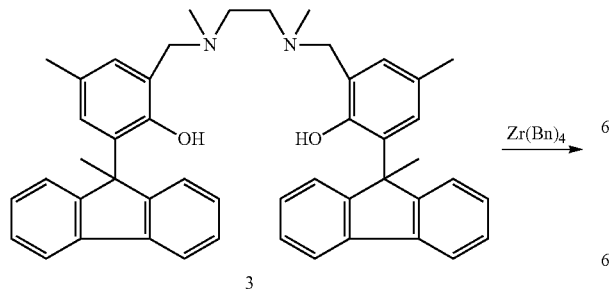

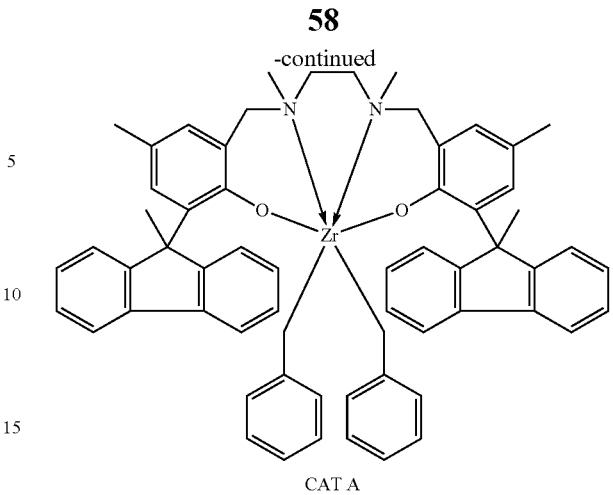

CAT A

In a vial, 3 (0.152 g. 0.22 mmol) was dissolved in 5 mL of toluene. In a separate vial, $Zr(Bn)_4$ (0.101 g, 0.22 mmol) was dissolved in 5 mL of toluene. The zirconium solution was added to the ligand solution while stirring and allowed to stir for 1 h. Toluene was then removed resulting in a yellow/orange residue. The residue was slurried in pentane then filtered leaving a yellow solid and orange filtrate. Yield of yellow solid (4) was 0.153 g (73 wt %).

Synthesis of Compound B (CAT B)

CAT B was prepared as described above for CAT A using $Hf(Bn)_4$ in place of $Zr(Bn)_4$.

CAT B

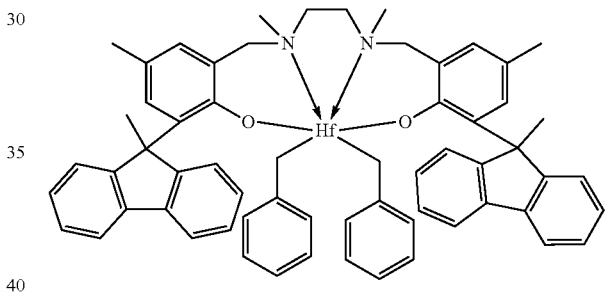

General Procedure for Olefin Polymerization

Batch olefin polymerizations were performed in a Parr bomb reactor in a high throughput polymerization testing (HTPT) apparatus under the conditions indicated in the various tables using either the zirconium embodiment of the catalyst (CAT A) or the hafnium embodiment of the catalyst (CAT B) along with an activator. The resultant polymer was then characterized by NMR. The data are shown in Tables 1, 2, 3, and 4. MAO refers to methylalumoxane. D4 refers to DMAH-perfluorophenyl boron activator (4).

(4)

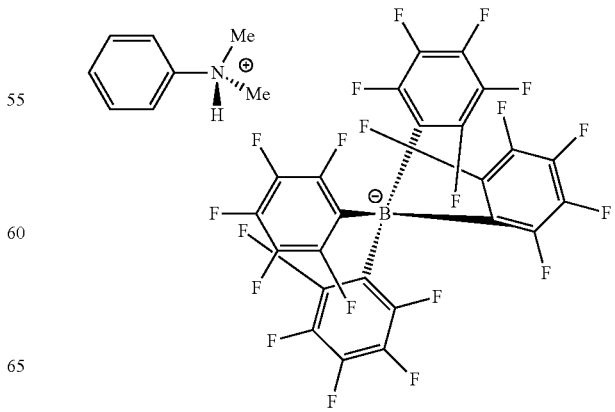

Ethylene polymerization results with and without octene-1 comonomer are presented in Tables 1 and 2. Propylene polymerization results are presented in Tables 3 and 4.

TABLE 1

Ethylene polymerization - Zirconium Catalyst (CAT A)
All polymerizations in HTPT using 0.02 μmol (CAT A) with 500 eq. of MAO.

| Sample | Octene Used (mg) | T, °C. | Mw (g/mol) | PDI ($M_w/M_n$) | $T_m$ (°C.) | Activity (g mmol$^{-1}$h$^{-1}$) | Wt % Comonomer |
|---|---|---|---|---|---|---|---|
| 1 | 0 | 70 | 623,000 | 2.0 | 136.2 | 86,681 | 0 |
| 2 | 0 | 100 | 478,000 | 2.3 | 135.4 | 88,283 | 0 |
| 3 | 0 | 100 | 499,000 | 1.8 | 135.8 | 92,349 | 0 |
| 4 | 35.75 | 70 | 406,000 | 2.4 | 124.9 | 87,398 | 4.0 |
| 5 | 35.75 | 100 | 272,000 | 2.1 | 124.0 | 100,627 | 4.9 |
| 6 | 35.75 | 100 | 287,000 | 1.9 | 124.8 | 92,800 | 4.8 |
| 7 | 71.5 | 70 | 367,000 | 2.2 | 121.4 | 88,076 | 6.2 |
| 8 | 71.5 | 100 | 237,000 | 2.2 | 119.6 | 85,482 | 7.4 |
| 9 | 71.5 | 100 | 277,000 | 2.2 | 114.2 | 21,992 | 5.7 |

TABLE 2

Ethylene polymerization - Hafnium Catalyst (CAT B)
All polymerizations in HTPT using 0.02 μmol
(CAT B) with 500eq of MAO at 100° C.

| Sample | Octene Used (mg) | Mw (g/mol) | PDI ($M_w/M_n$) | $T_m$ (°C.) | Activity (g mmol$^{-1}$h$^{-1}$) | Wt % Comonomer |
|---|---|---|---|---|---|---|
| 10 | 0 | 1,541,000 | 2.7 | 136.6 | 13,935 | 0 |
| 11 | 0 | 1,709,000 | 2.4 | 136.1 | 15,164 | 0 |
| 12 | 35.75 | 985,000 | 2.1 | 117.9 | 22,725 | 5.3 |
| 13 | 35.75 | 1,038,000 | 2.2 | 119.9 | 24,061 | 4.5 |
| 14 | 71.5 | 823,000 | 2.0 | 114.2 | 20,298 | 7.5 |
| 15 | 71.5 | 854,000 | 2.0 | 114.2 | 21,992 | 7.4 |

TABLE 3

Propylene polymerization - Zirconium Catalyst (CAT A)
All polymerizations in HTPT using 0.02 μmol (CAT A) with 1.1 eq. D4.

| Sample | Propylene Pressure (kPa) | T, °C. | Mw (g/mol) | PDI ($M_w/M_n$) | $T_m$ (°C.) | Activity (g mmol$^{-1}$h$^{-1}$) |
|---|---|---|---|---|---|---|
| 16 | 827 | 70 | 211,000 | 1.8 | 130.6 | 2,765 |
| 17 | 827 | 70 | 214,000 | 1.7 | 131.8 | 2,894 |
| 18 | 896 | 85 | 130,000 | 1.7 | 127.9 | 908 |
| 19 | 896 | 85 | 131,000 | 1.7 | 127.9 | 1,138 |
| 20 | 965 | 100 | 82,000 | 1.6 | 124.2 | 493 |
| 21 | 965 | 100 | 82,000 | 1.8 | 124.2 | 450 |

TABLE 4

Propylene polymerization - Hafnium Catalyst (CAT B)
All polymerizations in HTPT using 0.02 μmol (CAT B) with 1.1 eq. D4.

| Sample | Propylene Pressure (kPa) | T, °C. | Mw (g/mol) | PDI ($M_w/M_n$) | $T_m$ (°C.) | Activity (g mmol$^{-1}$h$^{-1}$) |
|---|---|---|---|---|---|---|
| 22 | 827 | 70 | 618,000 | 1.7 | 145.3 | 1,456 |
| 23 | 827 | 70 | 618,000 | 1.7 | 145.0 | 1,435 |
| 24 | 896 | 85 | 254,000 | 1.7 | 143.2 | 837 |
| 25 | 896 | 85 | 273,000 | 1.7 | 143.1 | 946 |
| 26 | 965 | 100 | 82,000 | 1.8 | 141.2 | 501 |
| 27 | 965 | 100 | 82,000 | 1.8 | 140.5 | 447 |

Preparation of Isotactic Polypropylene.

A Parr bomb and a glass bottle were chilled to −85° C. Dried MAO (376 mg, 6.16 mmol) and (CAT A) (11.2 mg, 0.0117 mmol) were added to the glass bottle. Condensed propylene (20.5 g, 487 mmol) was poured into the bottle then the bottle was sealed inside the Parr bomb. The bomb was heated up to 70° C. in an oil bath and was allowed to stir for 1 hr. The bomb was then removed from the oil bath, vented and opened. Yield of polypropylene was 11.058 g. Activity: 944 g polymer/(mmol cat*hr). The polypropylene was highly isotactic as indicated in the $^1$H NMR spectra shown in FIG. 1.

These data show the catalyst compounds, catalyst systems, and polymerization processes disclosed herein can produce polymers having improved properties, such as high polymer melting point, high polymer molecular weights, an increased conversion and/or comonomer incorporation.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments according to the invention, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A catalyst compound represented by the formula:

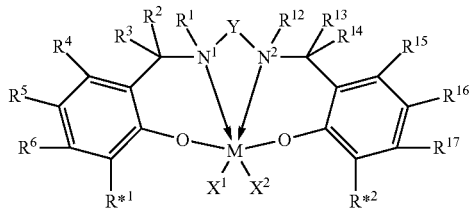

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

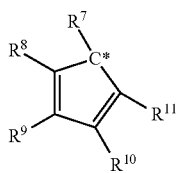

wherein C* indicates an attachment carbon of the radical;
each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;
$R^7$ is a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

2. The catalyst compound of claim 1, wherein each of $R^{*1}$ and $R^{*2}$ independently comprises a substituted or unsubstituted cyclopentadienyl radical, and wherein one of $R^{*1}$ and $R^{*2}$ independently comprises a substituted or unsubstituted cyclopentadienyl radical represented by the formula:

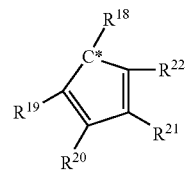

wherein C* indicates an attachment carbon of the radical;
wherein each of $R^{18}$, $R^{19}$, $R^{20}$, $R^{21}$, and $R^{22}$ is, independently, hydrogen, a $C_1$-$C_{40}$ hydrocarbyl radical, a functional group comprising elements from Groups 13 to 17 of the periodic table of the elements, two or more of $R^{19}$, $R^{20}$, $R^{21}$, and $R^{22}$ independently join together to form a $C_4$ to $C_{62}$ cyclic or polycyclic ring structure, or a combination thereof.

3. The catalyst compound of claim 2, wherein each of $R^7$ and $R^{18}$ is a $C_1$-$C_{12}$ aliphatic radical or a phenyl radical.

4. The catalyst compound of claim 1, wherein at least one of $R^{*1}$ and $R^{*2}$ independently comprises a substituted or unsubstituted $C_4$-$C_{20}$ aliphatic radical or a $C_4$-$C_{20}$ alicyclic radical.

5. The catalyst compound of claim 1, wherein at least one of $R^{*1}$ and $R^{*2}$ independently comprises an electron withdrawing functional group comprising —$NO_2$, —$CF_3$, —$CCl_3$, —$CBr_3$, —$CI_3$, —CN, —$SO_3H$, —COOH, —CHO, —F, —Cl, —Br, —I, —$COOR^\alpha$, —$COR^\alpha$, —$NR^\alpha_3{}^+$, or a combination thereof, wherein each $R^\alpha$ is independently hydrogen or a $C_1$-$C_{20}$ alkyl radical.

6. The catalyst compound of claim 1, wherein Y is a divalent cyclic, branched or linear $C_1$ to $C_{12}$ aliphatic radical.

7. The catalyst compound of claim 1, wherein Y is selected from the group consisting of methylene, ethylene, propylene, butylene, pentylene, hexylene, octylene, nonylene, decylene, undecylene, dodecylene, cyclohexylene, phenylene, and isomers thereof.

8. The catalyst compound of claim 1, wherein Y is ethylene (—$CH_2CH_2$—), 1,2-cyclohexylene, 1,2-phenylene, or 2-benzylene.

9. The catalyst compound of claim 1, wherein M is Hf, Ti, or Zr.

10. The catalyst compound of claim 1, wherein each of $X^1$ and $X^2$ is, independently, a halogen or a $C_1$ to $C_7$ hydrocarbyl radical, provided however when M is trivalent, $X^2$ is not present.

11. The catalyst compound of claim 1, wherein each of $X^1$ and $X^2$ is a benzyl radical, provided however when M is trivalent, $X^2$ is not present.

12. The catalyst compound of claim 1, wherein each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a halogen, or a $C_1$ to $C_{30}$ hydrocarbyl radical.

13. The catalyst compound of claim 1, wherein each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a halogen, or a $C_1$ to $C_{10}$ hydrocarbyl radical.

14. The catalyst compound of claim 1, wherein at least one of $R^{*1}$ and $R^{*2}$ independently comprises a 6-membered aromatic ring.

15. The catalyst compound of claim 1, wherein at least one of $R^{*1}$ and $R^{*2}$ independently comprises an indenyl ring system or a fluorenyl ring system.

16. The catalyst compound of claim 1, wherein $R^1$ and $R^{12}$ are independently selected from the group consisting of methyl, trifluoromethyl and 2,2,2-trifluoroethyl, wherein at least one of $R^1$ and $R^{12}$ is trifluoromethyl or 2,2,2-trifluoroethyl.

17. The catalyst compound of claim 1, represented by the formula:

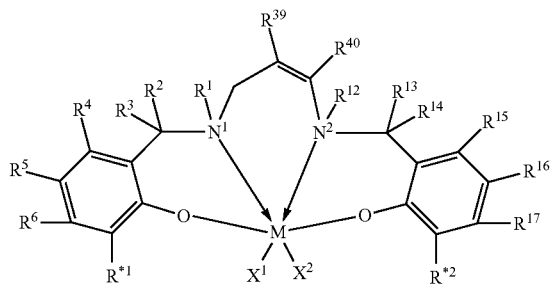

wherein each $R^{39}$ and $R^{40}$ is, independently, hydrogen, a $C_1$-$C_{40}$ hydrocarbyl radical, a functional group comprising elements from Groups 13 to 17 of the periodic table of the elements, $R^{39}$ and $R^{40}$ join together to form a $C_4$ to $C_{62}$ cyclic or polycyclic ring structure, or a combination thereof.

18. The catalyst compound of claim 1, represented by the formula:

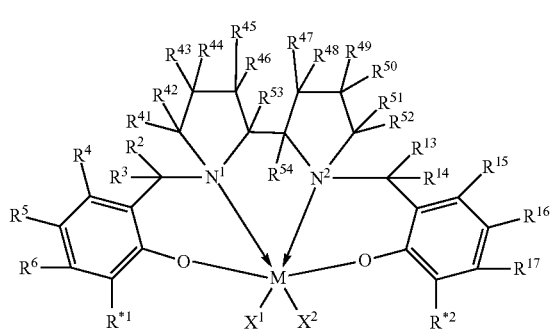

and wherein each of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ is, independently, hydrogen, a $C_1$-$C_{40}$ hydrocarbyl radical, a functional group comprising elements from Groups 13 to 17 of the periodic table of the elements, two or more of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ independently join together to form a $C_4$ to $C_{62}$ cyclic or polycyclic ring structure, or a combination thereof.

19. A catalyst compound represented by the formula:

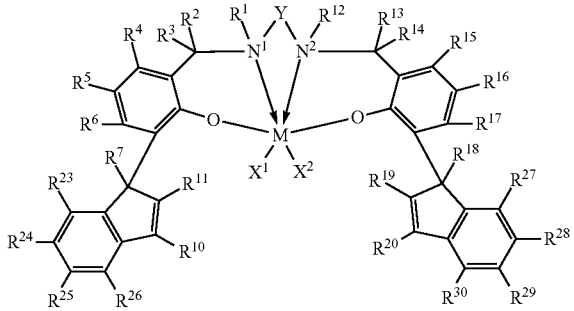

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ independently join together to form a $C_4$ to $C_{62}$ cyclic or polycyclic ring structure, or a combination thereof;
each $R^7$ and $R^{18}$ is, independently, a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

20. A catalyst compound represented by the formula:

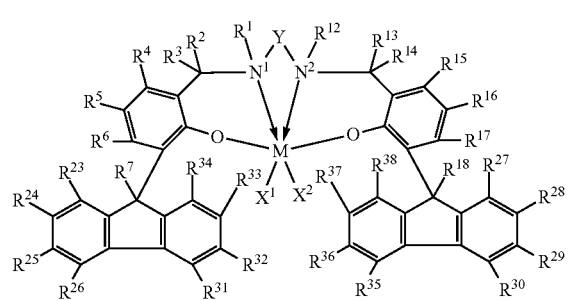

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ independently join together to form a $C_4$ to $C_{62}$ cyclic or polycyclic ring structure, or a combination thereof;

each $R^7$ and $R^{18}$ is, independently, a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

21. The catalyst compound of claim 20, wherein:
M is Zr or Hf;
$X^1$ and $X^2$ are benzyl radicals;
$R^1$, $R^5$, $R^7$, $R^{12}$, $R^{16}$, and $R^{18}$ are methyl radicals;
$R^2$, $R^3$, $R^4$, $R^6$, $R^{13}$, $R^{14}$, $R^{15}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are hydrogen; and
Y is ethylene (—$CH_2CH_2$—).

22. A catalyst system comprising:
an activator and a catalyst compound represented by the formula:

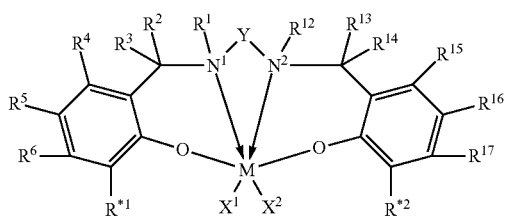

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

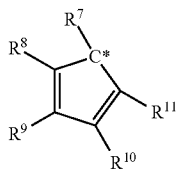

wherein C* indicates an attachment carbon of the radical;
each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;
$R^7$ is a $C_1$-$C_{40}$ hydrocarbyl radical or a functional group comprising elements from Groups 13 to 17 of the periodic table of the elements; and
Y is a divalent $C_1$ to $C_{20}$ hydrocarbyl radical.

23. A process comprising:
contacting one or more olefins with a catalyst system at a temperature, a pressure, and for a period of time sufficient to produce a polyolefin;
the catalyst system comprising an activator and a catalyst compound represented by the formula:

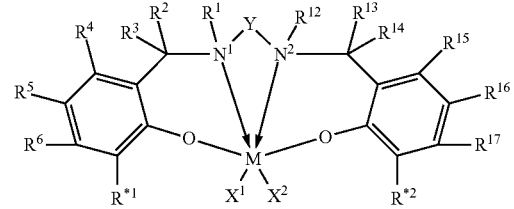

wherein each solid line represents a covalent bond and each arrow represents a bond having a varying degree of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
wherein each of $R^{*1}$ and $R^{*2}$ independently comprises a bulky functional group, an electron withdrawing group, or a combination thereof, and wherein at least one of $R^{*1}$ and $R^{*2}$ independently comprises a cyclopentadienyl radical having the structure:

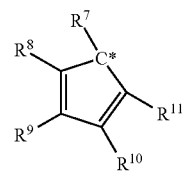

wherein C* indicates an attachment carbon of the radical;
each $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof;

$R^7$ is a $C_1$-$C_{40}$ hydrocarbyl radical or a functional group comprising elements from Groups 13 to 17 of the periodic table of the elements; and Y is a divalent $C_1$ to $C_{20}$ hydrocarbyl radical.

24. The process of claim 23, wherein the catalyst compound is according to one of formula I, formula II, or formula III, formula I comprising:

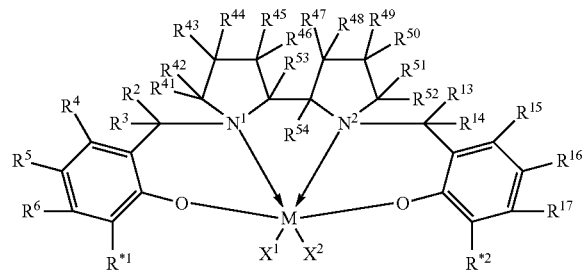

(I)

wherein each of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ is, independently, hydrogen, a $C_1$-$C_{40}$ hydrocarbyl radical, a functional group comprising elements from Groups 13 to 17 of the periodic table of the elements, two or more of $R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, and $R^{54}$ independently join together to form a $C_4$ to $C_{62}$ cyclic or polycyclic ring structure, or a combination thereof;

formula II comprising:

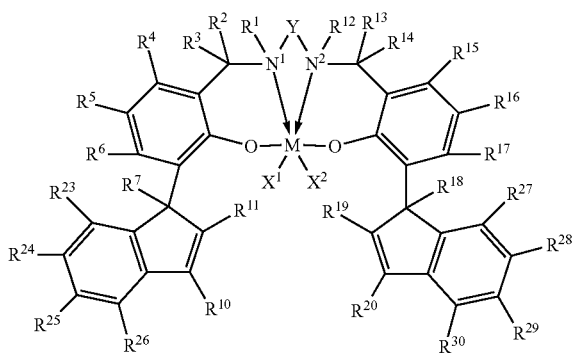

wherein each $R^7$ and $R^{18}$ is, independently, a $C_1$-$C_{40}$ hydrocarbyl radical or a functional group comprising elements from Groups 13 to 17 of the periodic table of the elements; and each $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{19}$, $R^{20}$, $R^{23}$, $R^{24}$, $R^{25}$, $R^{26}$, $R^{27}$, $R^{28}$, $R^{29}$, and $R^{30}$ independently join together to form a $C_4$ to $C_{62}$ cyclic or polycyclic ring structure, or a combination thereof;

formula (III) comprising:

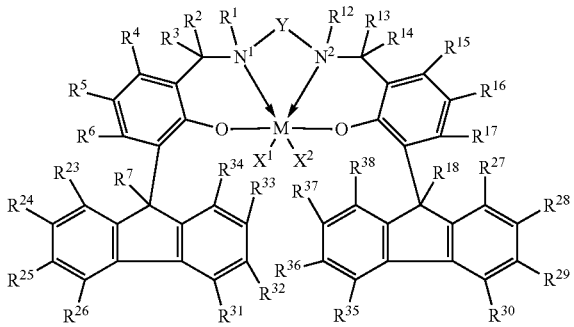

wherein each $R^7$ and $R^{18}$ is, independently, a $C_1$-$C_{40}$ hydrocarbyl radical or a functional group comprising elements from Groups 13 to 17 of the periodic table of the elements; and each $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ is, independently, hydrogen, a $C_1$-$C_{40}$ hydrocarbyl radical, a functional group comprising elements from Groups 13 to 17 of the periodic table of the elements, two or more of $R^1$, $R^2$, $R^3$, $R^4$, $R^5$, $R^6$, $R^{12}$, $R^{13}$, $R^{14}$, $R^{15}$, $R^{16}$, $R^{17}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ independently join together to form a $C_4$ to $C_{62}$ cyclic or polycyclic ring structure, or a combination thereof.

25. The process of claim 23, wherein the catalyst compound is disposed on a support.

26. The process of claim 23 wherein the polyolefin produced comprises an ethylene polymer having an Mw of at least 500,000 g/mol.

27. The process of claim 23 wherein the polyolefin produced comprises a propylene polymer having an isotacticity of at least 90%.

28. The process of claim 27, wherein the propylene polymer has an Mw of at least 500,000 g/mol.

* * * * *